US010402333B2

(12) United States Patent
Sato et al.

(10) Patent No.: US 10,402,333 B2
(45) Date of Patent: Sep. 3, 2019

(54) COMPUTER SYSTEM INCLUDING PLURALITY OF TYPES OF MEMORY DEVICES AND METHOD

(71) Applicant: Hitachi, Ltd., Tokyo (JP)

(72) Inventors: Katsuto Sato, Tokyo (JP); Nobukazu Kondo, Tokyo (JP); Naruki Kurata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/769,348

(22) PCT Filed: Jan. 18, 2016

(86) PCT No.: PCT/JP2016/051249
§ 371 (c)(1),
(2) Date: Apr. 19, 2018

(87) PCT Pub. No.: WO2017/126003
PCT Pub. Date: Jul. 27, 2017

(65) Prior Publication Data
US 2018/0307607 A1    Oct. 25, 2018

(51) Int. Cl.
*G06F 12/08*    (2016.01)
*G06F 12/0862*    (2016.01)
(Continued)

(52) U.S. Cl.
CPC .......... *G06F 12/0862* (2013.01); *G06F 12/10* (2013.01); *G06F 12/1009* (2013.01);
(Continued)

(58) Field of Classification Search
CPC .............. G06F 12/0862; G06F 12/109; G06F 12/1009; G06F 12/08; G06F 12/10;
(Continued)

(56) References Cited

U.S. PATENT DOCUMENTS

| 6,886,085 B1* | 4/2005 | Shuf | .................. G06F 9/30047 |
| | | | 711/143 |
| 2015/0242121 A1 | 8/2015 | Tsirkin | |

(Continued)

OTHER PUBLICATIONS

International Search Report of PCT/JP2016/051249 dated Feb. 16, 2016.

*Primary Examiner* — Hiep T Nguyen
(74) *Attorney, Agent, or Firm* — Mattingly & Malur, PC

(57) ABSTRACT

A computer system includes a main memory, a lower class memory, and a secondary storage medium and executes an operating system, an in-memory computing program, and a prefetch optimizer program. The in-memory computing program writes processing target data including a plurality of data objects stored in the secondary storage medium into a plurality of continuous areas on a virtual memory space and executes a process while accessing the continuous area. When detecting that the operating system executes a class-in process triggered upon a page fault for a predetermined virtual page, the prefetch optimizer program acquires information of the continuous area from the in-memory computing program and directs the operating system to execute a class-in process for virtual pages included in the predetermined continuous area including the predetermined virtual page.

2 Claims, 18 Drawing Sheets

(51) Int. Cl.
*G06F 12/10* (2016.01)
*G06F 12/1009* (2016.01)
*G06F 12/109* (2016.01)

(52) U.S. Cl.
CPC .... *G06F 12/109* (2013.01); *G06F 2212/1016* (2013.01); *G06F 2212/6026* (2013.01); *G06F 2212/654* (2013.01)

(58) Field of Classification Search
CPC ..... G06F 2212/1016; G06F 2212/6026; G06F 2212/654
See application file for complete search history.

(56) References Cited

U.S. PATENT DOCUMENTS

2015/0347302 A1* 12/2015 Hagersten ........... G06F 12/0862 711/122
2018/0024938 A1* 1/2018 Paltashev ............ G06F 12/0897 711/133

\* cited by examiner

OS EVENT NOTIFICATION

OS ADVICE

CLIENT REQUEST

CLIENT REQUEST RESULT

The Behavior of Prefetch Optimizer 300

COMPUTER SYSTEM INCLUDING PLURALITY OF TYPES OF MEMORY DEVICES AND METHOD

TECHNICAL FIELD

The present invention relates to a computer system including a plurality of types of memory devices.

BACKGROUND ART

An operating system (OS), for example, as disclosed in PTL1, provides a virtual memory space larger than the capacity of a main memory of a computer for each process using a virtual memory function. Generally, a virtual memory space is divided into areas having a fixed length (for example, 4 KB) called pages, and the main memory of a computer is allocated in units of the pages. Hereinafter, a divided area of the virtual memory space will be referred to as a "virtual page". Accordingly, data (hereinafter, referred to as "memory data") that is written into the virtual memory by a user program corresponding to a process is stored in an actual area (hereinafter, referred to as a "real page") of the main memory allocated to the page. Then, among this memory data, by saving memory data having a low possibility of being accessed (including at least being read or written) by a user program in an HDD, a virtual memory space larger than the capacity of the main memory of the computer described above is provided for a process. A general user program tends to have a relatively small amount of memory data accessed in a short time, in other words, to have access locality. Accordingly, there are many OS's using least recently used (LRU) as an algorithm for determining a virtual page having a "low possibility of being accessed" described above.

CITATION LIST

Patent Literature

PTL1: U.S. Patent Application Publication No. 2015/0242121

SUMMARY OF INVENTION

Technical Problem

In recent years, as a technique for realizing a high-speed data processing program, a processing technique called in-memory computing has attracted attention. In the case of a program corresponding to in-memory computing, before reception of a request (for example, an SQL request) from the outside, designated data (for example, the whole database or the whole table) is loaded from a secondary storage medium such as an HDD into a main memory, and, when a request is actually processed, the frequency of accessing the secondary storage medium is configured to be decreased or zero, whereby high-speed data processing is realized.

However, in a case in which data such as an image, a moving image, or speech, of which the data amount is larger than that of numerical values or texts, is set as a processing target, the data is loaded by an in-memory computing program, and a process is started, a case occurs in which memory data exceeding the capacity of the main memory of the computer needs to be stored in a virtual memory. However, there are cases in which an in-memory computing program (particularly, a DBMS executing online analytical processing (OLAP)) does not have the access locality described above, and, as a result, the in-memory computing program is frequently stopped temporarily in accordance with writing memory data into a secondary storage medium (generally, referred to as page-out or swap-out) and writing back memory data from a secondary storage medium to a main memory (generally, referred to as page-in or swap-in).

Solution to Problem

In order to solve the problems described above, a computer system includes a main memory, a lower class memory, and a secondary storage medium and executes an in-memory computing program and a prefetch optimizer program with an operating system. The in-memory computing program writes processing target data including a plurality of data objects stored in the secondary storage medium in a plurality of continuous areas in a virtual memory space and executes a process while accessing the continuous areas. When the execution of a class-in process, which is executed by an operating system, is detected by being triggered upon a page fault for a predetermined virtual page, the prefetch optimizer program acquires information of the continuous areas described above from the in-memory computing program and directs the operating system to execute the class-in process for a virtual page included in a predetermined continuous area including the predetermined virtual page.

Advantageous Effects of Invention

According to the present invention, the frequency of temporary stop of an in-memory computing program can be decreased.

DESCRIPTION OF EMBODIMENTS

First, an overview of an embodiment will be described. In description of embodiments, an in-memory database management system (DBMS) will be used as an example of an in-memory computing program, and Unix or Linux will be used as an example of an OS.

<0. Each Embodiment>

Figure 21:
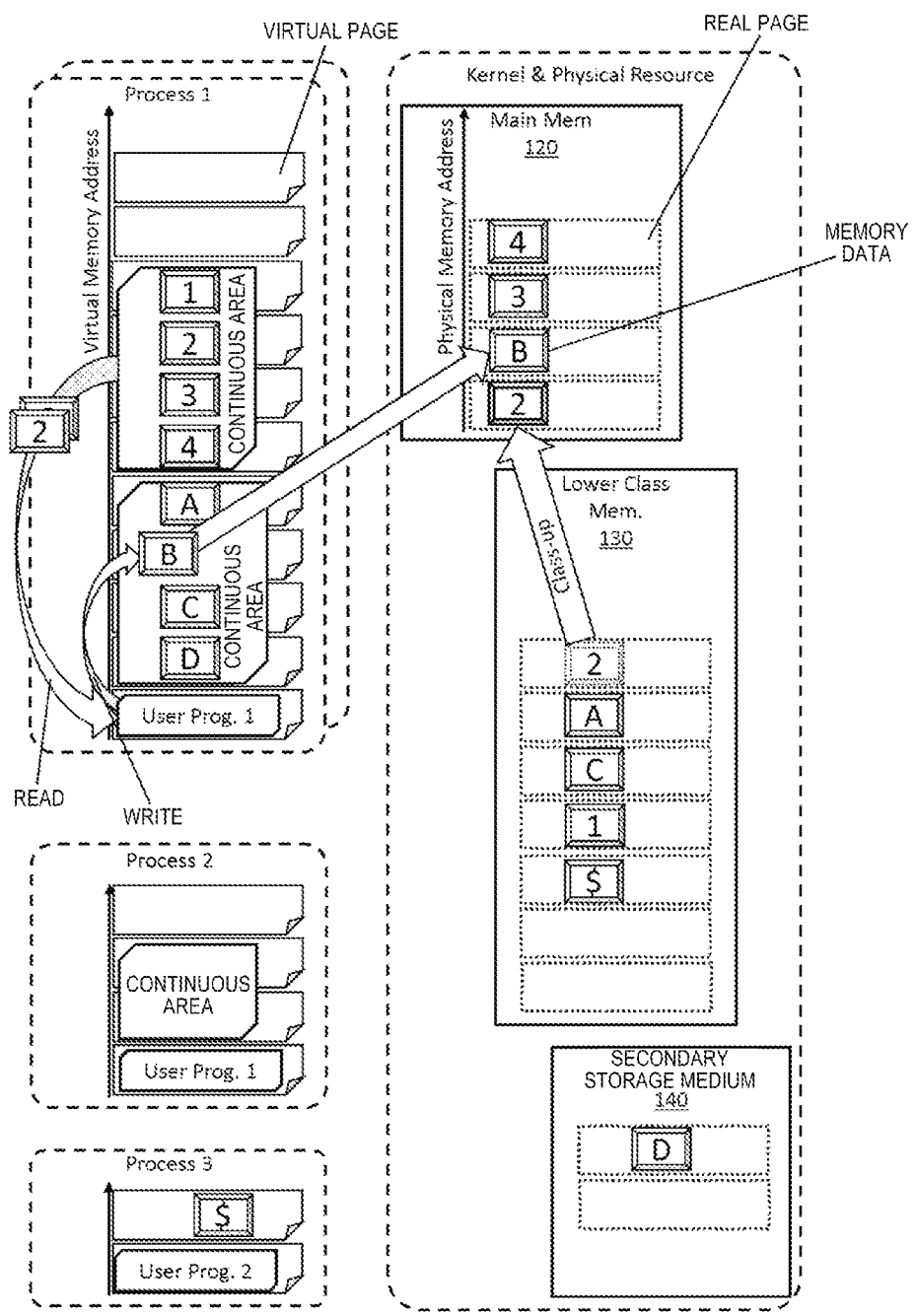
FIG. 21 is a diagram illustrating an overview of prefetch.

FIG. 21 is a diagram illustrating relations among a kernel program of an OS (hereinafter, abbreviated to "kernel"), a main memory 120, and a lower class memory 130 and processes 1 to 3 and an overview of prefetch according to this embodiment. The meaning of prefetch will be described later. A computer system includes: the main memory 120; the lower class memory 130; and a secondary storage medium 140. An example of the main memory 120 is a dynamic random access memory (DRAM) or a static random access memory (SRAM), and the main memory 120 may be any other semiconductor memory. The lower class memory 130 is a semiconductor memory having an access delay time from a central processing unit (CPU) to be longer than that of the main memory, and the access delay time is shorter than that of a hard disk drive (HDD). An example of the lower class memory 130 is a flash memory or a storage class memory (SCM). However, more appropriately, the lower class memory 130 is a semiconductor memory having writing durability higher than that of a flash memory and having an access delay time shorter than that of the flash memory.

The kernel provides a virtual memory space (in the drawing, denoted as "Virtual Memory Address") for each of the processes 1 to 3. In addition, for example, as in the case of the process 1, a plurality of processes may share a common memory space. As described in the conventional technology, the kernel manages a virtual memory space by dividing it into virtual pages.

The kernel divides storage areas of the main memory 120, the secondary storage medium 140, and the lower class memory 130 and allocates the divided areas to virtual pages as real pages. In addition, there are cases in which the secondary storage medium 140 is not necessarily needed for the computer system. The size of the real page may be considered to be the same as the size of the virtual page or may be not the same as the size of the virtual page.

<<0.1 Swap>>

In swap according to a conventional technology, particularly, a so-called swap-in process, in which transfer of memory data (data D in the drawing corresponds thereto) from the secondary storage medium 140 to the main memory 120 is executed, is executed in the following sequence.

(Step A) A user program corresponding to a process accesses a virtual memory address within a predetermined virtual page.

(Step B) The kernel detects that the main memory cannot be allocated to a predetermined virtual page in the support of a memory management unit (MMU) (hereinafter, referred to as a page fault).

(Step C) The kernel specifies a real page of the secondary storage medium 140 storing memory data of a predetermined virtual page inside the secondary storage medium 140 by referring to management information (information representing a correspondence relation between a real page inside the secondary storage medium and a virtual page) of the secondary storage medium 140 managed inside the kernel.

(Step D) The kernel reads memory data from the specified real page and stores the memory data in a real page of the main memory 120 that has not been used. Then, by updating a page table stored in the main memory 120, the kernel associates the real page of the main memory 120 in which the memory data has been newly stored previously with a predetermined virtual page. The page table includes information representing a correspondence relation between a virtual page and a real page of the main memory 120, and the MMU refers to the page table for translation between a virtual memory address and a real address of the main memory 120.

In addition, after the detection of Step A, the process of the user program (more specifically, a process) is temporarily stopped by the kernel until Step D is completed. A difference from the case of an I/O is that temporary stop of this program cannot be avoided. In the case of an I/O, since there are cases in which a system call or an API of a non-blocking type is provided by an OS, while reading necessary data from the secondary storage medium by using the means, the user program can execute another process (for example, may issue a system call of another I/O). However, since a page fault in accessing a virtual memory is only a blocking-type event, when there are 100 times of the occurrence of a page fault, the processing times of Steps A to D described above occur without overlapping with each other. For this reason, a state in which the swap-in process described above frequently occurs is also a factor degrading the processing performance of the process.

<<0.2 Relation Between Memory Access and Swap of in-memory DBMS>>

While the access characteristics of an in-memory DBMS for a virtual memory depend on a request for the DBMS, there are cases in which access locality is not included such as at the time of initialization, at the time of processing a request corresponding to on-line analytical processing (OLAP), and the like. In the case of initialization, for loading all the data of a designated table or index (or all the tables or indexes) from the secondary storage medium to the main memory, data is written into a virtual memory space corresponding to the size of a table that is a loading target. In the case of OLAP, since there are cases in which full scanning of a table loaded into the virtual memory for processing a request is executed, as a result, reading is executed from a virtual memory space of a wide range.

In a case in which swap-out for a secondary storage medium using an LRU as in a conventional case is applied to a user program having no access locality, more virtual pages are accessed in relatively near past than those of a user program having access locality, and an immediate access to a real page that has been swapped out into the secondary storage medium immediately before occurs, and swap-in and swap-out are frequently repeated. As a result, although an in-memory DBMS is used for increasing the speed of the process of a request, a situation occurs in which an aimed high-speed request process cannot be executed in accordance with an increase in the amount of table data. In the example illustrated in the drawing, in a case in which memory data 1 to memory data 4 and memory data A to memory data D are read as full scanning, there is only a capacity in the main memory that can store only four pieces of data, and, in order to execute full scanning of the second time, four times of swap-in occurs.

<<0.3. Plan for Reducing Program Temporary Stop Time According to this Embodiment>>

In this embodiment, for reducing a temporary stop time of a user program according to swap-in being triggered upon the page fault described above, the following is disclosed. Reduction plan 1: A memory data transfer time for the main memory 120 at the time of occurrence of a page fault is reduced. Reduction plan 2: The number of times of occurrence of swap-in triggered upon a page fault is reduced.

Hereinafter, the reduction plans will be described.

<<<0.3.1. Reduction Plan 1>>>

The reasons for requiring time for conventional swap-in from a secondary storage medium are as follows.

Reason 1: An access delay time for the secondary storage medium is long. An access to the secondary storage medium is performed by generating an I/O command such as an SCSI and transmitting the generated I/O command to the secondary storage medium. However, the secondary storage medium, generally, is connected through a communication medium such as a fibre channel (FC), a serial attached SCSI (SAS), a serial ATA (SATA), or the like in which the extendability is considered, and accordingly, there is a large protocol overhead for transmitting/receiving an I/O command. In addition, in a case in which the secondary storage medium is an HDD, a head seek time is added, and thus, it is not appropriate for a random access that is a characteristic of the I/O command for swap-in. In a case in which an FC is used, the communication time is further added, and the delay time is further increased.

Reason 2: The number of I/O commands of storage devices, which can be simultaneously executed, including a secondary storage medium is small, and it is not appropriate for a random access. In a protocol designed based on a disk device such as a SAS or a SATA, particularly, in a case in which the disk device is used as a direct attached storage (DAS), the number of commands that can be simultaneously executed is limited to about 32 at most, and thus, in a case in which it is necessary to perform a swap-in process for multiple separate disk offsets, command execution standby due to an execution multiplication restriction occurs.

In this embodiment, for the reasons, the following countermeasures are disclosed.

Countermeasure for Reason 1: The lower class memory 130 described above is used as a saving destination of memory data.

Countermeasure for Reason 2: A storage including a secondary storage medium supporting an I/O command protocol that is appropriate for a random access appropriate for a SCM is used. An example of such a protocol includes Non-Volatile Memory Express (NVMe). In the case of the NVMe, the maximum value of the number of commands that can be simultaneously executed is designed to be higher than that of a SAS or a SATA, and, there is a feature in which a storage device can read I/O commands on a main memory altogether by storing an I/O command group, in which a plurality of random access requests are stored, in a ring buffer on the main memory and transmitting a direction to the storage device.

In description presented hereinafter, in order to avoid confusion, a process of transferring memory data from the lower class memory 130 to the main memory 120 and updating a page table using a kernel (or an OS) will be referred to as "class up". Similarly, a process of transferring memory data from the main memory 120 to the lower class memory 130 and updating the page table using a kernel (or an OS) will be referred to as "class down". As memory data that is a target of class down, although memory data having a low possibility of being accessed later, similar to that of swap, may be considered to be targeted using an LRU or the like, class down may be executed by specifying the memory data as will be described later.

<<<0.3.2. Solution 2>>>

Swap-in or class-up being triggered upon a page fault is a process of resolving a state in which a user program corresponding to the process cannot access memory data desired to be accessed, and thus, the user program cannot process a request until necessary memory data is prepared. Although a signal handler is an exception thereof, since library functions that can be used inside the handler are limited, and the request process described above tends not to be implemented. The computer system according to this embodiment, for reducing the number of times of swap-in or class-up being triggered upon a page fault, a continuous area inside a virtual memory allocated to a data object by a user program is focused.

A user program that is an in-memory computing program, typically, stores a plurality of data objects of the same kind in a virtual memory space. An example of this data object is a record of a table or an attribute value included in a record in the case of a DBMS and is a content of a value in the case of a Key Value Store (KVS). The number of data objects is dynamically increased or decreased during a program operation. In addition, since a data object having a variable length is also present among data objects, there are cases in which an object size changes in accordance with the update of a data object. For example, a binary large object (BLOB) of the DBMS or the KVS is also a variable-length text.

The user program allocates a virtual memory continuous area described above to each data object. Since a minimum access unit for a virtual memory space is one byte or one word, at first glance, the amount of allocation may be considered as an area smaller than the size of a virtual page. However, for at least one of the following reasons, there are cases in which the size of the virtual memory continuous area is the size of a virtual page or more.

Increase in virtual memory management information: When a space and allocation of a virtual memory are managed in units of one byte or one word, a space area can be finely managed, but management information increases.

By storing a data object in a continuous area, an access speed from a user program becomes high. In a case in which the virtual memory is allocated in units of one byte or one word, there are cases in which a data object is distributed in a discontinuous virtual memory area, and thus, the processing cost for accessing the data object is higher than that of a case in which data is arranged in a continuous virtual memory area. For example, 100 data objects of 128 bytes are arranged in a continuous virtual memory area, this continuous area may be sequentially accessed for full scanning. In a case in which full scanning corresponding to a discontinuous area is realized, a table of pointers or a link list indicating areas of data objects need to be additionally arranged and used, and thus, the processing sequence for accessing a data object is increased. The allocation of a virtual memory continuous area having an appropriate size to a data object leads to decreasing excessive allocation of a virtual memory space to a data object while decreasing the access load of the user program.

In CPUs of recent years, for the purpose of increasing the speed of processing, a vector operation function applying one command to a plurality of pieces of continuous object data is supported, and, by using this, several times to several tens of times of data processing can be executed for the same number of execution commands. Object data of the same type needs to be continuously arranged on a virtual memory area for executing a vector operation, and thus, when a data management structure is designed in a form that is appropriate for the vector operation, the object data of the same type is continuously arranged.

As a management system of a secondary storage medium of a traditional DBMS of which the speed is not increased through in-memory computing, a continuous area on the secondary storage medium, in some cases, a disk partition or a storage volume is allocated to a data object such as a table or an index, and accordingly, at least a part of the management system is followed even when the in-memory computing is supported.

Figure 19:
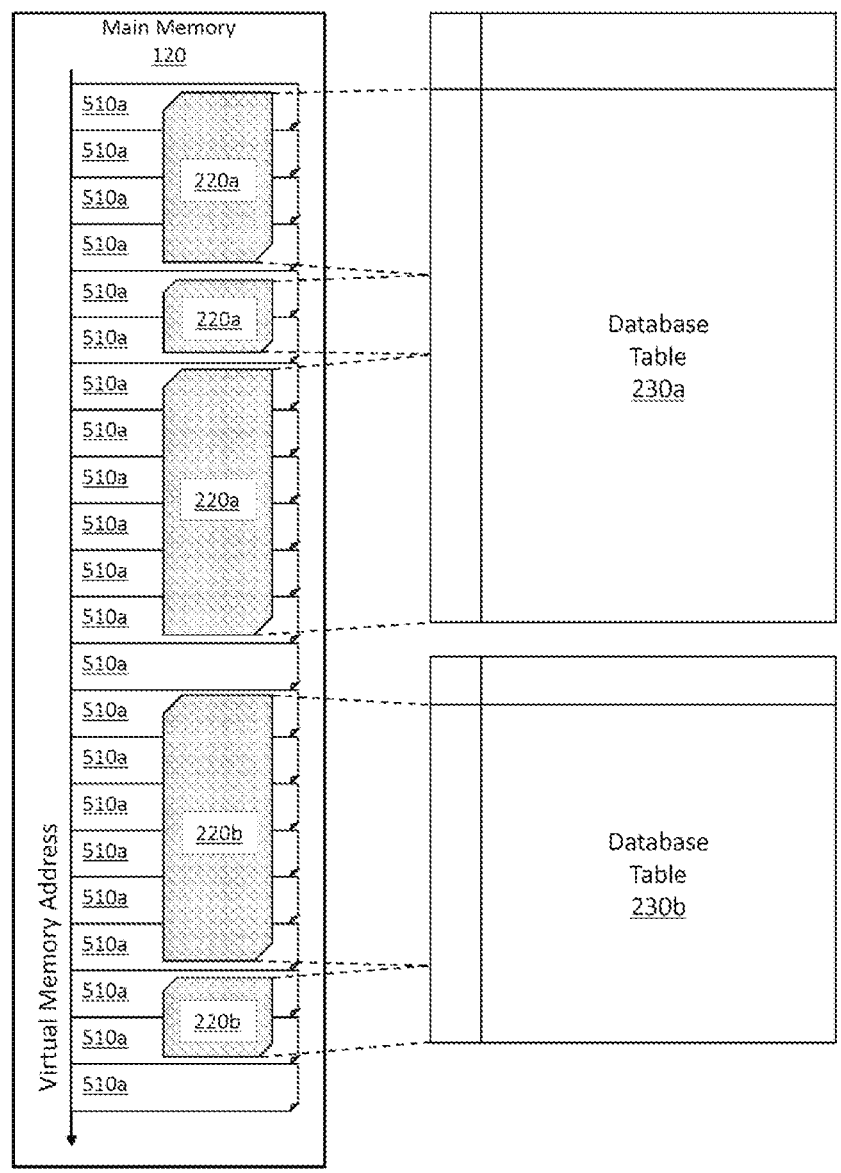
FIG. 19 is a diagram illustrating a continuous area of a virtual memory.

In addition, as illustrated in FIG. 19, continuous areas of a virtual memory allocated to data objects may have different sizes. In the example illustrated in the drawing, a case is illustrated in which two database tables 230 are stored in a virtual memory space. Constituent elements (for example, rows or attributes) of each table are regarded as data objects that are different from constituent elements of the other tables, and a continuous area 220 of the virtual memory is independently allocated to each table.

Referring back to FIG. 21, the description will be continued. The computer system according to this embodiment assumes that there is a high possibility that memory data included in a continuous area on the virtual memory as described above is accessed together and, when a page fault is detected by being triggered upon an access to one of virtual pages within the area, executes class-up for memory data of the other virtual pages within the area as targets on the background, in other words, executes prefetch for class-up (hereinafter, simply referred to as prefetch). In the example illustrated in the drawing, in a case in which a page fault occurs as a result of an access to memory data "2", it is assumed that there is a high possibility that all the virtual memory continuous areas in which memory data "1 to 4" is included is accessed, and it is determined that memory data "1, 3, and 4" needs to be prefetched into the main memory. In the example illustrated in the drawing, since the memory data "3 and 4" has already been present in the main memory, the memory data "1" that is stored in the lower class memory is a target for prefetch of the background. Here, "background" represents that class-up of memory data is executed asynchronously with the recovery of a process from temporary stop due to a page fault. The prefetch of the background can decrease a temporary stop time since a class-up process is executed while the execution of the process is continued particularly in a case in which a plurality of CPUs or CPU cores are present.

In this specification, while there are cases in which targets for prefetch, swap, and class-up/down are described to be omitted as virtual pages, these are prefetch, swap, and class-up/down for transferring memory data written in a virtual page. As a similar representation, while there are cases in which targets for prefetch, swap, and class-up/down are described to be omitted as real pages, these are prefetch, swap, and class-up/down for transferring memory data written in a virtual page.

<<<0.4 Differentiation Between Swap-in and Class-up>>>

Although swap-in and class-up have a similarity in processing, there is a big difference therebetween when seen from a viewpoint of a supervisor of a computer system. In a case in which a notification of an indication representing that the number of times of occurrence of swap-in is large or a display thereof in a user interface is executed, it represents to a supervisor a serious state in which the system performance is degraded due to insufficiency of the main memory 120. That is a so-called thrashing state, and this state is a serious state in which there are cases in which login to the computer system, execution of a management command, and the like cannot be executed.

Meanwhile, in the case of class-up, although the system performance is slightly lower than that of a case in which an operation is executed using only the main memory 120, it is in the category of an initial system design range of the computer system, and accordingly, the degree of seriousness of a status in which the number of times of occurrence of class-up is large is low. Accordingly, a notification or display should be executed for a supervisor such that swap-in/out class-up/down can be differentiated.

As above, overviews of the plans for reducing a program temporary stop time according to this embodiment have been described. Hereinafter, more detailed items and the other items will be described. In the following description, although a case described below will be described as an example unless otherwise mentioned, it is apparent that the technology can be also applied to any other examples.

An in-memory DBMS (hereinafter, simply referred to as a database program) as an in-memory computing program.

An SCM as the lower class memory 130.

An HDD as a secondary storage medium.

[Embodiment 1]

<1. First Form in which a Prefetch Library is Included in Database Program>

<<1.1. Configuration of Computer System>>

Figure 1:
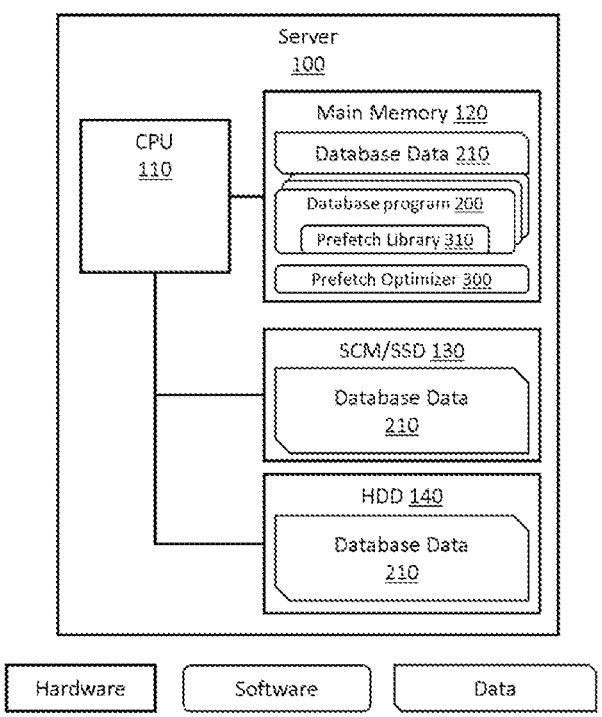
FIG. 1 is a diagram illustrating one example of a computer system according to Embodiment 1.

FIG. 1 is a diagram illustrating one example of a computer system according to Embodiment 1. The computer system includes one or more server computers 100 (hereinafter, simply referred to as servers). The server 100 includes a CPU 110, the main memory 120, and the SCM 130. In addition, the server 100 may include the HDD 140.

The main memory 120 stores a database program 200 and a prefetch optimizer 300 as user programs. Although not illustrated in the drawing, an OS including a kernel and the like is stored in the main memory 120 as well. In addition, a prefetch library 310 is included in the database program 200 as a program module.

The main memory 120 stores database data 210 as memory data (data of any other type may be also handled as memory data). This database data, for example, is a table or an index loaded from the HDD 140 or the SCM 130 to be described later. In addition, the database data before loading and the database data on the main memory 120 after loading do not necessarily need to have the same data structure and the same data format. While not illustrated in the drawing, data such as a page table generated and used by an OS is stored in the main memory 120.

The SCM 130 stores memory data having a lowered possibility of being accessed among the database data 210 stored in the main memory. In addition, since the SCM 130 is a nonvolatile memory, database data 210 that should not be volatilized at power-off may be stored as described above. As an example of such storage, in addition to a previous table or index, a log may be also considered.

The HDD 140 stores database data 210 that should not be volatilized at power-off. As an example of such storage, in addition to a previous table or index, a log may be also considered. In addition, the HDD 140 may be used for the swap described with reference to the conventional technology. Furthermore, in the HDD 140, execution files of various programs described in the embodiment are stored.

The CPU 110 is a device that executes programs such as the OS, the database program 200, and the prefetch optimizer 300 stored in the main memory. More preferably, in the computer system, a plurality of CPUs 110 are present, or a plurality of cores are included inside the CPU 110.

Figure 2:
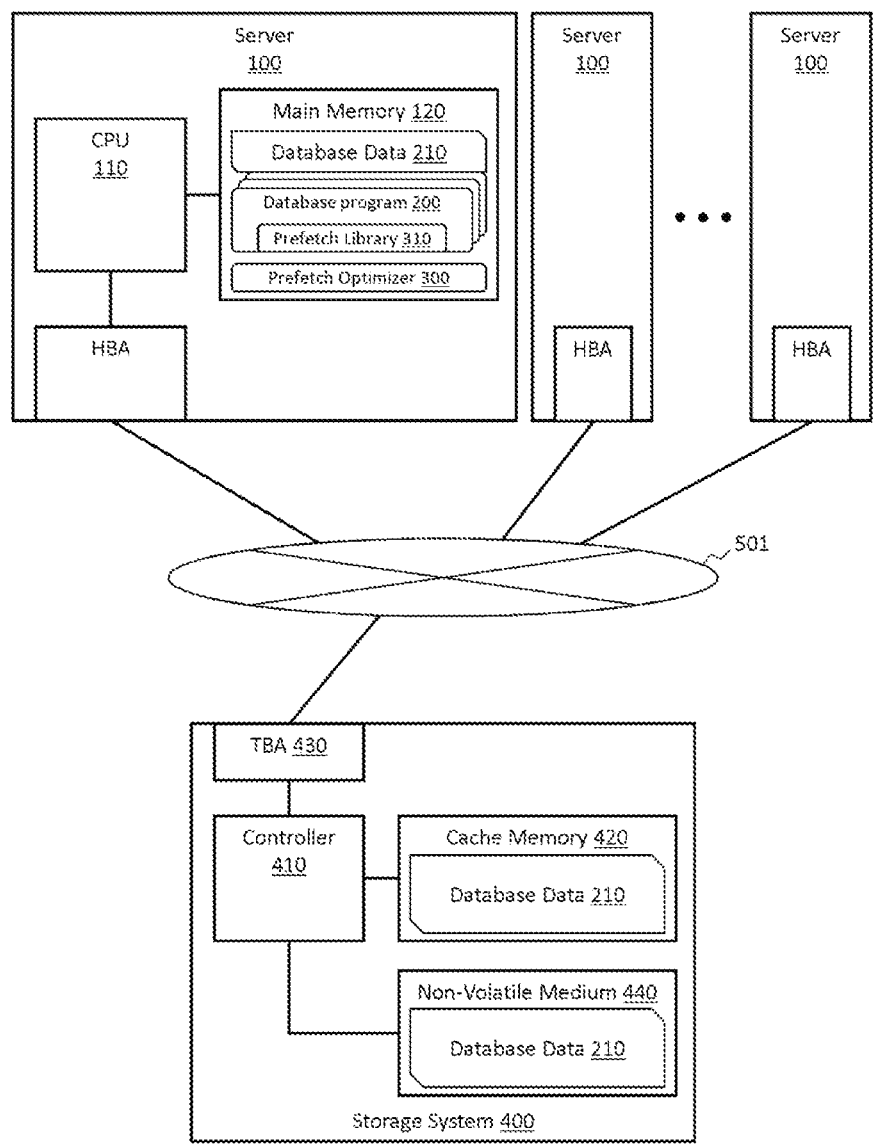
FIG. 2 is a diagram illustrating an example of another computer system according to Embodiment 1.

FIG. 2 is a diagram illustrating an example of another computer system according to Embodiment 1. A difference from that illustrated in FIG. 1 is that the CPU 110 is connected to a storage system 400 through a host bus adapter (HBA) via a network 501. While the storage 400 corresponds to the secondary storage medium 140, it may correspond to the lower class memory 130. In the case of this configuration, while a delay time described in Reason 2 described above increases, there is an advantage of efficiently providing a storage area for a plurality of servers 100. The storage system 400 includes: a target bus adapter (TBA); a storage controller 410; a cache memory 420; and a nonvolatile storage medium 440 such as an HDD or a flash memory.

<<1.2 Relation of Programa>>

Figure 3:
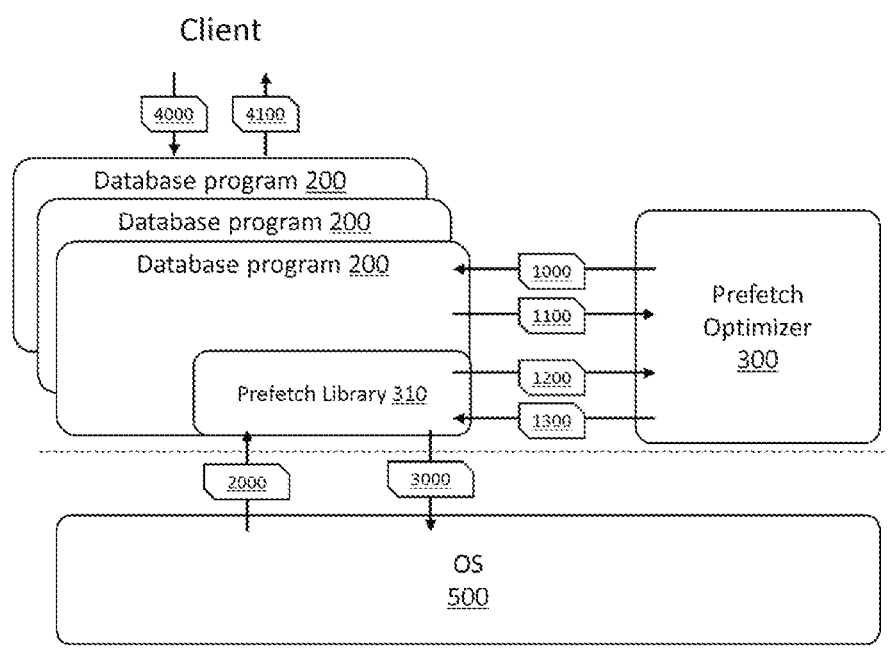
FIG. 3 is a diagram illustrating a relation of programs executed by the computer system according to Embodiment 1.

FIG. 3 is a diagram illustrating a relation of programs executed by the computer system according to Embodiment 1.

Figure 14:
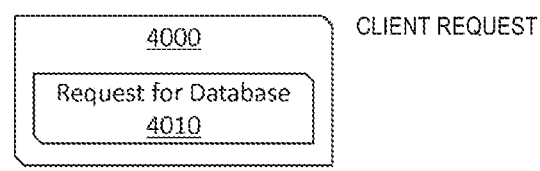
FIG. 14 is a diagram illustrating contents of information that is exchanged between programs.
Figure 14:
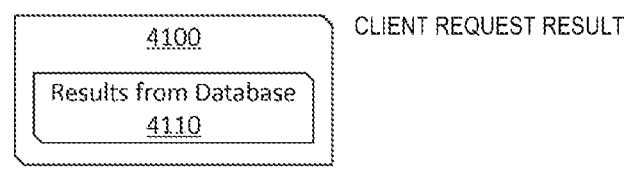

The database program 200 receives a request 4000 (for example, a table definition, a SQL query, or the like (hereinafter, referred to as a client request)) as illustrated in FIG. 14 from a client computer disposed outside the computer system and transmits a result 4100 (hereinafter, referred to as a client request result). In addition, this processing result 4100, for example, in the case of a success/failure of the processing of an SQL query or a SELECT statement, is data of a part of an extracted table.

The prefetch optimizer 300 collects information from the database program 200 and specifies a virtual page that is a prefetch target.

The prefetch library 310 is a program module of the database program 200. The prefetch library 310 notifies a page fault to the prefetch optimizer 300 or notifies an advice of prefetch to an OS 500.

The OS 500 is an aggregation of programs including a kernel, a library, a resident program, and the like. In addition, while a part of the items described as the processes executed by the OS according to this embodiment may be considered to be executed by an additional program arranged outside the OS, a loadable kernel module, or a resident program, these are considered as customization of the OS 500, and thus, the items will be described as being included in the OS 500. Furthermore, the prefetch optimizer 300 or the prefetch library 310 may be a part of the OS 500.

Figure 11:
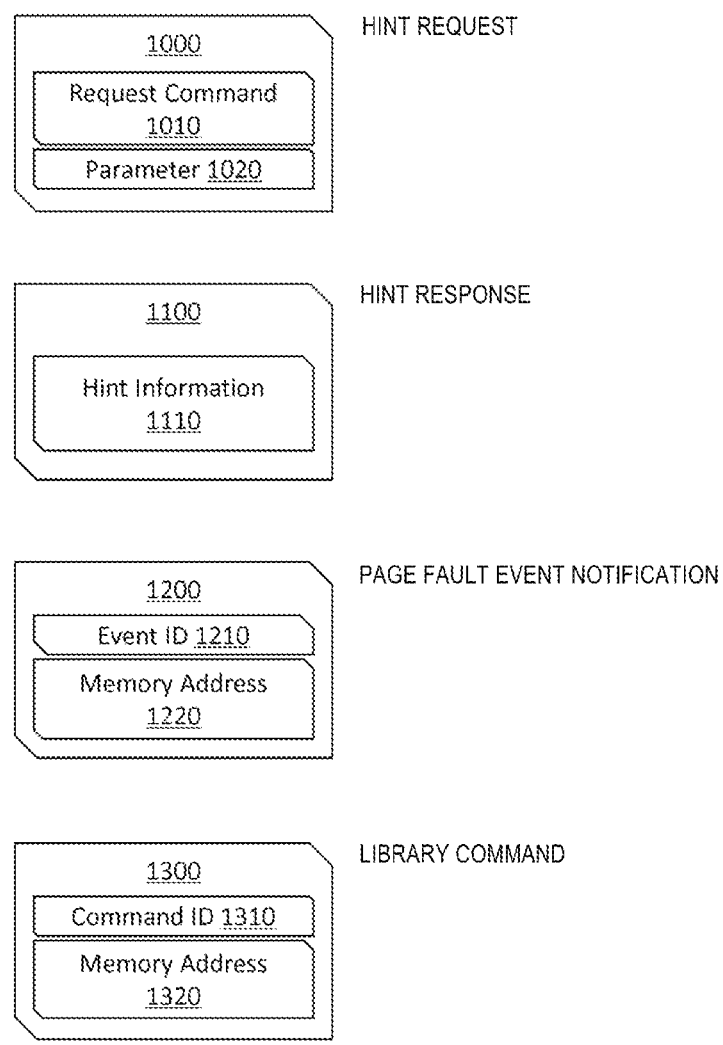
FIG. 11 is a diagram illustrating contents of information that is exchanged between programs.
Figure 12:
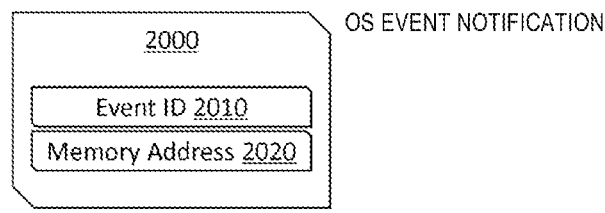
FIG. 12 is a diagram illustrating contents of information that is exchanged between programs.
Figure 13:
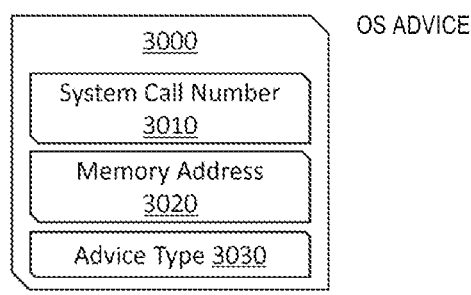
FIG. 13 is a diagram illustrating contents of information that is exchanged between programs.

The programs described above execute prefetch while mutually transmitting and receiving information. FIGS. 11 to 13 are diagrams illustrating contents of the information. Here, while "virtual memory address" appearing in each information may be considered as being in a form in which a start address and an end address (or a length of the area) are designated, a form in which an identifier of a virtual page or a list of identifiers is designated, a form in which only a virtual address is designated, or the like, any form may be employed as long as one or more virtual pages can be directly or indirectly designated.

A hint request 1000 is transmitted from the prefetch optimizer 300 to the database program 200. The hint request 1000 includes a command 1010 and a parameter 1020 accompanying the command 1010. In a response 1100 of the hint request 1000, hint information 1110 is included.

A page fault event notification 1200 is transmitted from the prefetch library 310 to the prefetch optimizer 300. In the page fault event notification 1200, an event ID 1210 and a virtual memory address in which the event ID 1210 has occurred are included. In addition, while not illustrated in the drawing, in the page fault event notification 1200, an ID of a process corresponding to the database program 200 may be included.

A library command 1300 is transmitted from the prefetch optimizer 300 to the prefetch library 310. The library command 1300 includes a command ID 1310 and a virtual memory address 1320. In this computer system, the command ID 1310 can designate the followings.

Class-up: Class-up of a virtual page included in an address designated by the virtual memory address 1320 is executed.

Class-down: Class-down of a virtual page included in an address designated by the virtual memory address 1320 is executed.

Class-keep: It represents that the class-down of a virtual page included in an address designated by the virtual memory address 1320 is suppressed.

Class keep release: The effect of the class-keep described above is cancelled.

In addition to these, the command ID 1310 may designate swap-in or swap-out. Regarding the class-down, a different ID may be allocated to the class-down for each priority level of the class-down (is necessarily executed or needs to be executed as possibly as can) or each timing of the class-down (for example, immediate execution or delayed execution). This similarly applies also to the class-keep or the class-up. In the following description, for the simplification of the description, a denotation "library command (class-up)" will be used, and the inside of the parenthesis represents designation as the command ID 1310.

An OS event notification 2000 is transmitted from the OS 500 to the prefetch library 310. In the OS event notification 2000, an event ID 2010 indicating a page fault and a virtual memory address 2020 in which the page fault has occurred are included. In addition, as a method for realizing the event notification, a flow to be described later may be mounted in the form of a signal handler in a library using a signal provided by the OS for a process.

An OS advice 3000 is transmitted from the prefetch library 310 to the OS 500. The OS advice 3000 is considered to be issued in accordance with a madvise system call. In such a case, in the OS advice 3100, a system call number 3010 corresponding to madvise, a virtual memory address 3020, and an advice type 3030 are included. In this computer system, the advice type 3030, similar to the command ID 1310, can designate class-up, class-down, class-keep, or class-keep release. Additionally, variations described in the command ID 1310 may be designated. In addition, in the following description, for the simplification of the description, a denotation "OS advice (class-up)" will be used, and the inside of the parenthesis represents designation as the advice type 3030.

In addition, as a system call such as madvise, the system call needs to be issued by designating an address on the virtual memory from a process having the virtual memory space. In other words, a system call such as madvise designating a virtual memory space of a process from another process cannot be issued. For this reason, the prefetch library 310 receives the library command 1300 and issues a system call. In addition, in Linux, an OS advice (class-keep) may be realized by a system call mlock, and an OS advice (class-keep release) may be realized by a system call munlock.

<<<1.2.1 Relation Between Prefetch Optimizer and Database Program>>>

The prefetch optimizer 300 has a plurality of in-memory computing programs (more precisely, processes corresponding to these programs) including the database program 200 as management targets and is appropriate for efficient use of the main memory 120 that is a shared resource of these processes. The reasons are as follows.

There are cases in which processes of a plurality of types of in-memory computing programs of are simultaneously present in the server 100. For example, the reason is that there are cases in which a process of an in-memory DBMS program and a process of an (in-memory) KVS program share a server. In addition, in such cases, a virtual memory continuous area allocated to a data object is different for each program.

There are cases in which different database instances generated from the same user program are simultaneously present inside the server 100. In addition, in such cases, a virtual memory continuous area allocated to a data object is different for each instant.

There are cases in which a plurality of processes are generated for executing the database program 200, a shared virtual memory space is arranged among the generated processes, and database data is stored in the shared virtual memory space. For example, there is a case in which, in the case of a plurality of client computers transmitting client requests 4000 to the database program, one or more processes are generated at a time point at which the client computers generate TCP connections for transmitting the requests, the requests from the client computers are processed by the one or more processes that have been generated, and thereafter, the generated processes end. In such a case, prefetch control in consideration of all the generated process groups is necessary. For example, it is useless to issue prefetch to the same virtual page from each of the processes of each virtual page inside a shared virtual memory space, and, on the other hand, a virtual memory space for a working space of each process is considered not to be shared, and thus, it is necessary to differentiate transmission of a library command to each process. In addition, for a program in which the generation of a process and the deletion of a process are frequently executed, by managing and applying hint information as a process group for a shared virtual memory space, prefetch can be executed also for a process that has been lately generated before hint information is collected.

In addition, also in the case of multithreading, a prefetch optimizer shared by a plurality of threads may be present.

<<1. 3. Operation Time Line of Computer System>>

Figure 4:
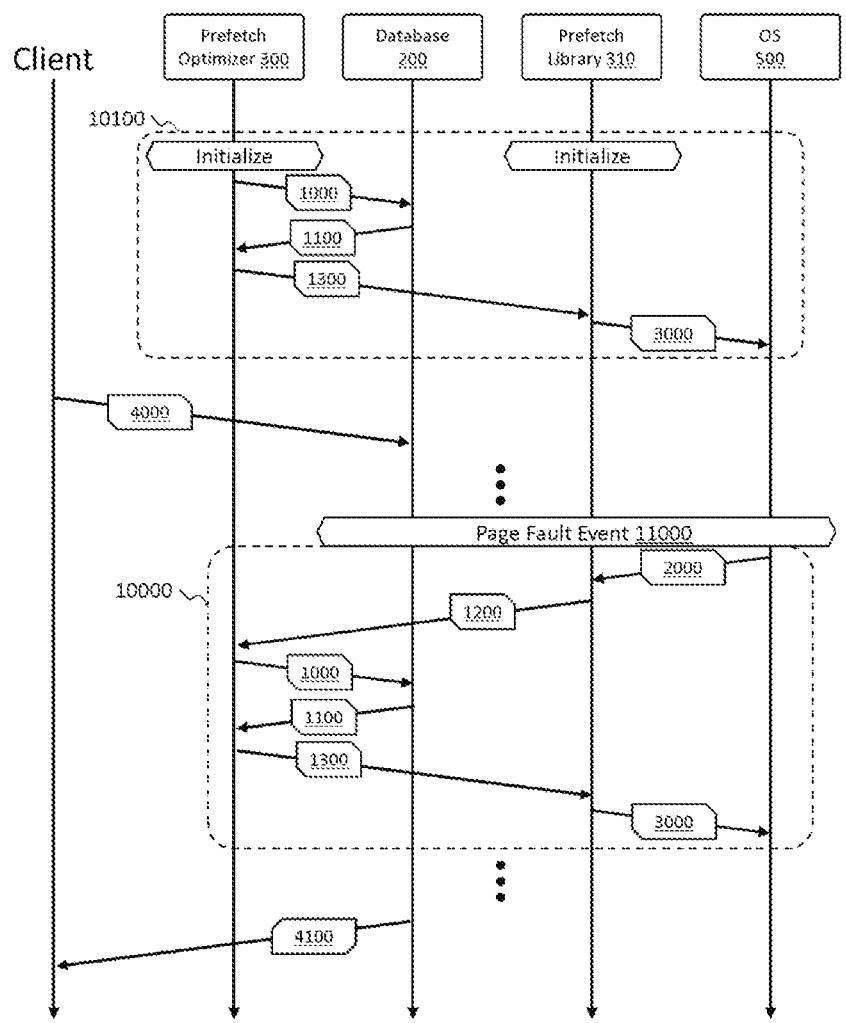
FIG. 4 is a diagram illustrating a time line of prefetch in the computer system according to Embodiment 1.

FIG. 4 is a diagram illustrating a time line of prefetch in the computer system according to Embodiment 1. In addition, FIGS. 5 to 8 are diagrams illustrating overviews of a computer system before/after prefetch. The prefetch will be described with reference these drawings.

<<<1.3.1. Initialization Phase>>>

As denoted by 10100 illustrated in FIG. 4, each of the prefetch optimizer 300 and the prefetch library 310 performs initialization before actually issuing a library command. First, each of the prefetch optimizer 300 and the prefetch library 310 performs initialization thereof. Thereafter, the prefetch optimizer 300 transmits the hint request 1000 to the database and acquires the hint response 1100. In addition, as the hint information 1110 included in the hint response 1100, information of a virtual memory continuous area allocated to the data object described above (more specifically, a list of a start address and a length of the area) may be considered, and any other hint may be used.

In addition, a database program, at the time of loading database data such as a table or an index, frequently accesses a wider range of a virtual memory area in a shorter time than that of a case in which a request from a client is processed. However, when the load is completed once, thereafter, the virtual memory area has a low possibility of being an access target unless the client request 4000 is received. However, in an access possibility determination based on the LRU, a virtual page accessed at the time of loading is determined to have a relatively high possibility of being accessed and remains in the main memory 120, and thus, memory data of other virtual pages is swapped out from the main memory 120 or is caused to have class-down. By executing class-down after the end of loading, such a situation can be avoided.

For this reason, in a case in which a state in which a database program is loading is acquired from the hint information 1110, the prefetch optimizer 300 may transmit the library command (class-down) 1300 targeted for virtual pages in which the data object that has been completed to be loaded to the prefetch library 310. The prefetch library 310 that has received the library command (class-down) 1300 executes the class-down by transmitting the OS advice (class-down) 3000 for virtual pages designated for the same OS 500 as targets.

To the contrary, in a case in which a virtual memory area, in which memory data that is certainly to give a critical influence to the performance when the class-down thereof is executed, is stored can be specified from the hint information 1110, the prefetch optimizer 300 may transmit the library command (class-keep) 1300 designating the virtual memory area. As a result, the prefetch library 310 executes the class-keep by transmitting an OS advice (class-keep) designating the virtual memory area to the OS 500.

In addition, also during this initialization phase, there are cases in which the prefetch library 310 receives the OS event notification 2000 representing a page fault. In such cases, prefetch to be described next may be executed.

<<<1.3.2. Page Fault Linking Phase>>>

Figure 5:
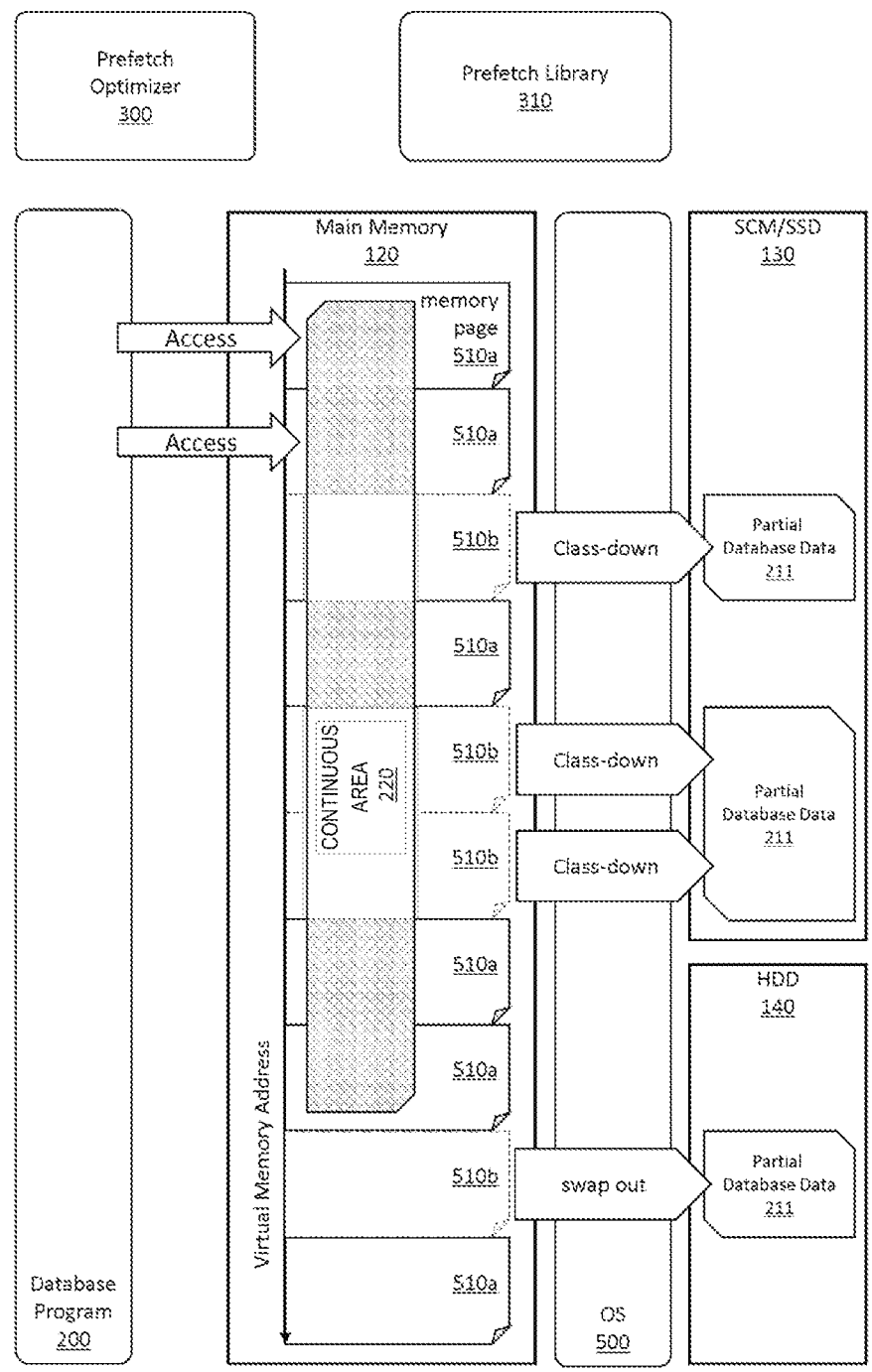
FIG. 5 is a diagram illustrating an overview of a computer system before/after prefetch.

After the completion of the initialization of the database program 200, the database program 200 receives the client request 4000 and processes the client request 4100 while accessing the database data in accordance with the client request 4000. FIG. 5 illustrates the state at this time as an example. The class-down of apart (memory data) of database data stored in virtual pages having a low possibility of being accessed by the process of the OS 500 is executed. In the example illustrated in FIG. 5, three memory pages 510b correspond thereto. On the other hand, an access target of the database program 200 is a virtual page (here, a corresponding real page is present in the main memory 120), and thus, a part (memory data) of the class-down database data in the SCM 130 remains to be stored in the SCM 130.

Figure 6:
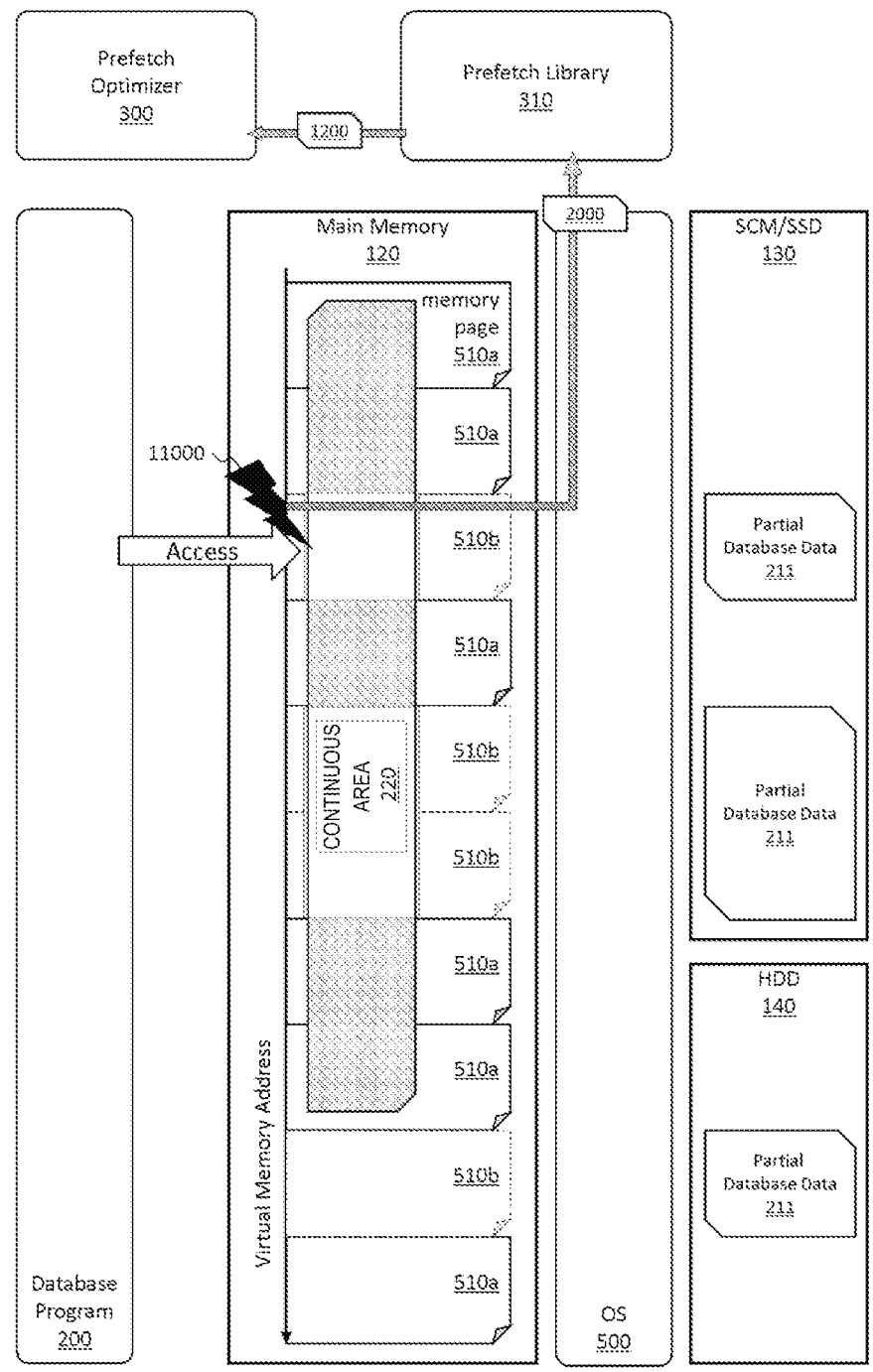
FIG. 6 is a diagram illustrating an overview of a computer system before/after prefetch.

Next, an example in which a page fault (11000) is detected by being triggered upon processing of a request from a client is illustrated in FIG. 6. First, as in FIG. 4, the OS event notification 2000 representing a page fault is transmitted from the OS 500 to the prefetch library 310. The prefetch library 310 that has received the notification transmits the page fault event notification 1200 to the prefetch optimizer 300. As described above, in this notification 1200, a virtual memory address is included as information used for specifying a virtual page in which the page fault has occurred. In addition, the OS 500 executes the class-up of the virtual page including the access address that has triggered the detection of the page fault.

Figure 7:
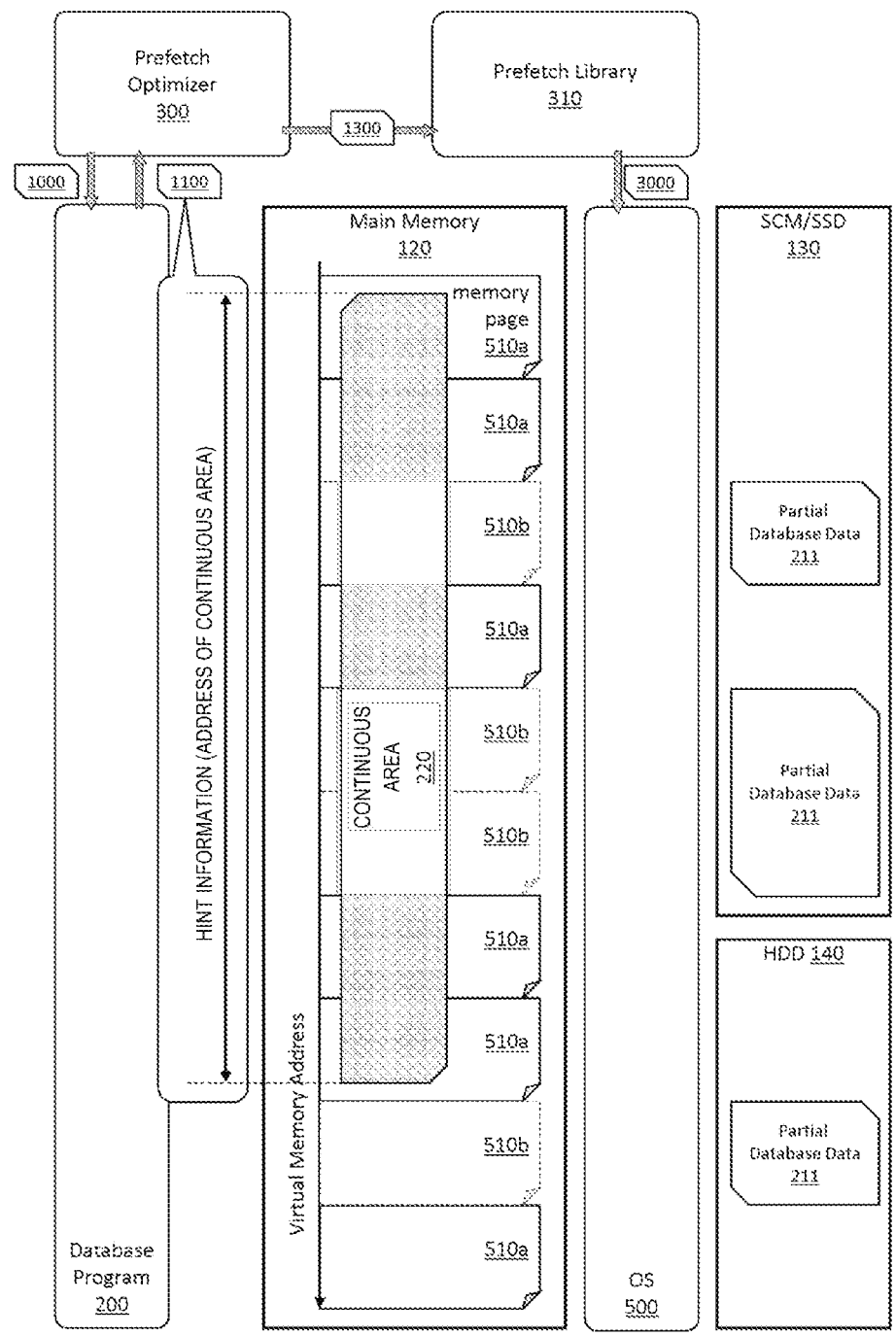
FIG. 7 is a diagram illustrating an overview of a computer system before/after prefetch.

Thereafter, as illustrated in FIG. 7, the prefetch optimizer 300 transmits the hint request 1000 to the database program 200 and receives the hint response 1100 from the database program. 200. In addition, as described above, in the hint information 1110 included in the hint response 1100, information of a virtual memory continuous area allocated to the data object may be included. An example thereof is a list of a start address and a size of the continuous area for each data object. Since the allocation of the virtual memory to the data object is dynamically changed, hint information is repeatedly acquired by being triggered upon a page fault in this way. In addition, in the hint information 1110, a latest setting or state of the program or the process may be included. Furthermore, the acquisition of information, which is not dynamically changed, at this timing according to the hint request 1000 may be omitted.

Thereafter, the prefetch optimizer 300 specifies a virtual page that is a target for prefetch from a plurality of virtual pages of one or more processes in consideration of the hint information 1110. Then, the prefetch optimizer 300 transmits the library command (class-up) 1300 designating the specified virtual page to the prefetch library 310. The prefetch library 310 transmits the OS advice (class-up) 3000 designating the virtual page designated by the library command (class-up) 1300 to the OS 500. Accordingly, prefetch using the OS 500 is executed in the background.

Figure 8:
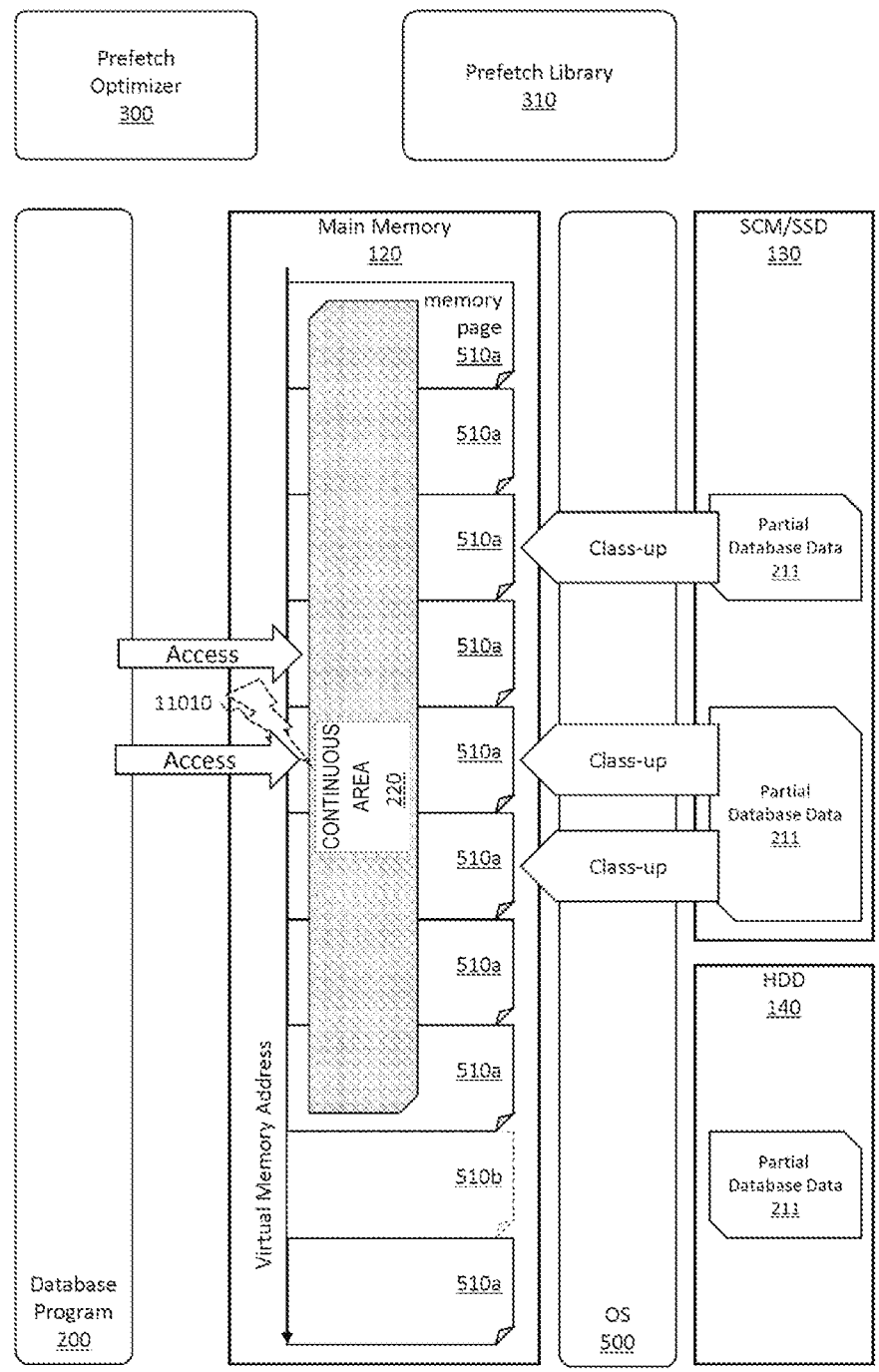
FIG. 8 is a diagram illustrating an overview of a computer system before/after prefetch.

FIG. 8 is a diagram illustrating that a page fault is not detected as a result of the execution of the prefetch in the background, and an access of the database program 200 to the virtual memory can be continued. "11010" illustrated in FIG. 8 represents absence of a page fault event to occur in a case in which this sequence is not executed.

The reason for a direction of the class-up of a virtual page triggering the detection of a page fault being triggered by the OS 500 without directing the class-up from the prefetch library 310 or the prefetch optimizer 300 is that it is considered that the hint information 1110 cannot be generated by the database program 200 in the state of temporary stop due to a page fault.

Finally, the database program 200 transmits a result of the processing of the client request 4000 to the client computer as a result 4100.

<<<1.3.3. Case in which Size of Allocated Virtual Memory Continuous Area is Excessively Large>>>

Figure 20:
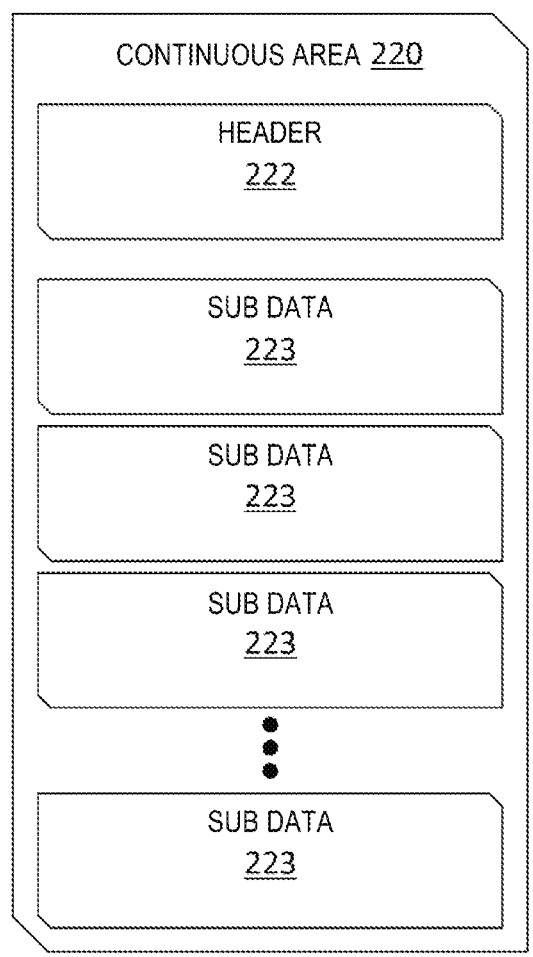
FIG. 20 is a diagram illustrating one example of the configuration of a continuous area.

In a case in which the allocated virtual memory continuous area is excessively larger than the size of the virtual page, when the whole area is stored in the main memory 120 in accordance with background prefetch, the number of virtual pages that are targets for the class-down or swap-out is increased as a reaction. As a countermeasure thereof, it may be considered that the data format of the inside of the virtual memory continuous area is acquired as the hint information 1110 (or prefetch optimizer built-in information), and a part of the virtual pages having high access frequencies is pre-fetched with priority. For example, as illustrated in FIG. 20, in a case in which it can be perceived that a header 222 is stored at the start of the continuous area 220, a virtual page in which the header 222 is stored may be pre-fetched with priority. As another countermeasure, it may be considered that the prefetch is temporarily stopped (or the start thereof is delayed), the occurrence frequency of a page fault is measured for each of virtual pages included in the continuous area, and, when the prefetch is actually executed, the prefetch is executed by limiting targets to virtual pages having high occurrence frequencies of a page fault.

<<<1.3.4. Class-down Direction Linked with Prefetch>>>

In addition, since a space area of the main memory 120 is necessary for executing prefetch, the class-down described above may be executed before the execution of the prefetch.

<<1.4. Processing Flow of Prefetch Optimizer>>

Figure 15:
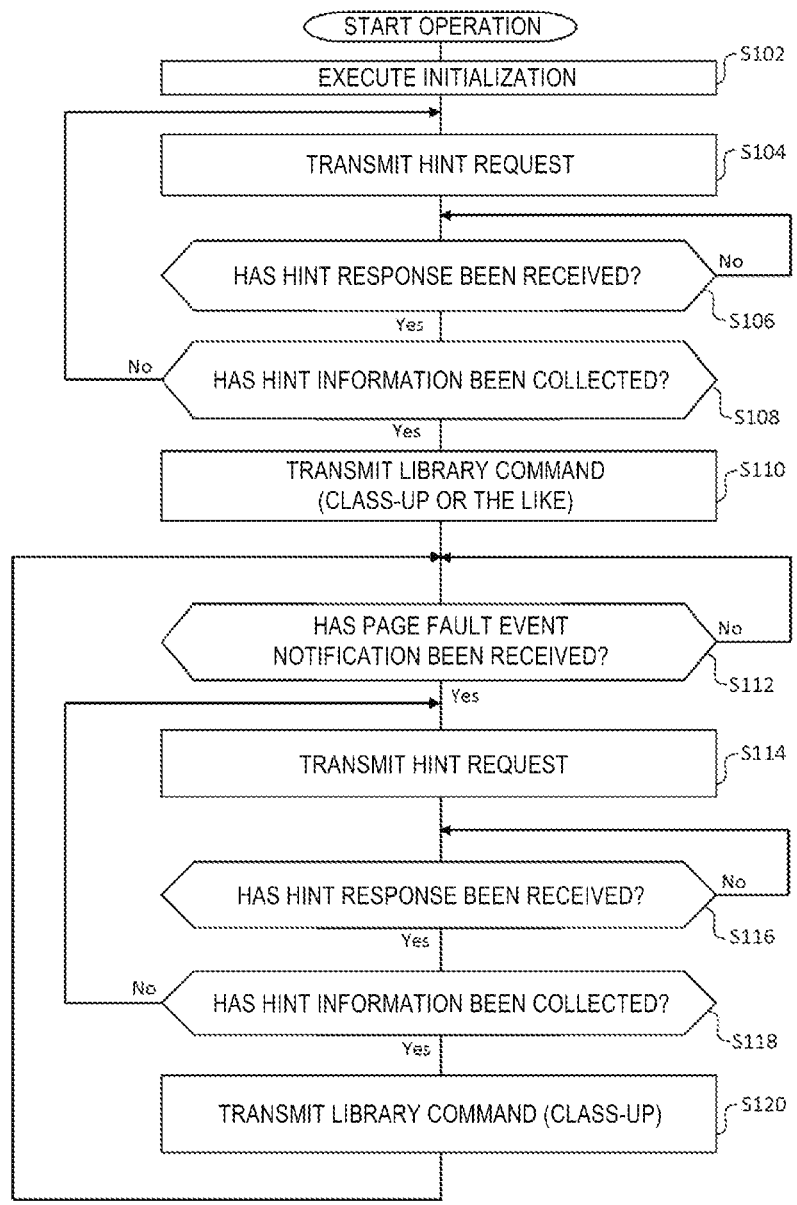
FIG. 15 is a diagram illustrating the processing flow of a prefetch optimizer according to Embodiment 1.

FIG. 15 is a diagram illustrating the processing flow of the prefetch optimizer 300 according to Embodiment 1. Hereinafter, the flow will be described.

(S102) The prefetch optimizer 300 executes initialization thereof. As a part of the initialization, the initialization of the process management information managed by the prefetch optimizer 300 or the preparation of communication with the prefetch library 310 between processes are included. In addition, the process management information is stored in the main memory 120, the SCM 130, or the HDD 140 and includes the following information for each process.

Process ID

Process group ID (option)

Name of user program designated at the time of generating process

Hint Information 1110

As a method of registering information in the process management information, it may be considered to acquire a process ID and a process group ID of the database program 200 in which the library 310 is present and the name of a user program by communicating with the prefetch optimizer 300 between processes at the time point of the initialization of the prefetch library 310. However, the information registration may be executed using any other method. For example, there is a method using output of a ps command of Unix.

(S104) The prefetch optimizer 300 transmits the hint request 1000 to each process registered in the process management information.

(S106) The prefetch optimizer 300 receives the hint response 1100 including the hint information 1110 from each process and stores the hint information 1110 in the process management information.

(S108) The prefetch optimizer 300 determines whether or not the hint information 1110 for prefetch has been collected by referring to the process management information. In a case in which the hint information has been collected, S110 is processed. Otherwise, S104 is processed.

(S110) The prefetch optimizer 300 specifies a process and a virtual page of a prefetch target and transmits the library command (class-up) 1300 using communication between processes to the prefetch library 310 of the specified process. In addition, in association with this step, the library command (class-down) 1300 described above may be transmitted to the prefetch library 310.

(S112) The prefetch optimizer 300 receives the page fault event notification 1200 from the prefetch library 310.

(S114) The prefetch optimizer 300 specifies a transmission source process of the page fault event notification 1200 and transmits the hint request 1000 to the process.

(S116) The prefetch optimizer 300 receives the hint response 1100 and stores the hint information 1110 included in the response 1100 in the process management information. In addition, the hint information at this time may be the same type as that of S106 or may be information of a different type.

(S118) The prefetch optimizer 300 determines whether or not the hint information 1110 for prefetch has been collected. In a case in which the hint information has been collected, S120 is processed, and otherwise, S114 is processed.

(S120) The prefetch optimizer 300 specifies a process and a virtual page of a prefetch target and transmits the library command (class-up) 1300 using communication between processes to the prefetch library 310 of the specified process. In addition, in association with this step, the library command (class-down) 1300 described above may be transmitted to the prefetch library 310. The number of the library commands (class-up) 1300 may be one or more. In addition, in a case in which additional transmission is determined not to be necessary in consideration of the transmission status of the library command (class-up) 1300 transmitted immediately before, the library command (class-up) 1300 may not be transmitted. For example, it is natural that the transmission of the library command (class-up) 1300 to the same virtual memory address area should be suppressed for a predetermined time (about a time required for the class-up).

In addition, when a virtual page of the prefetch target is specified in S110 and S120, it is apparent that, by selecting the hint information 1110 corresponding to the process that has detected a page fault from the process management information and considering the selected hint information 1110, different hint information can be associated for each process. In addition, by grouping a plurality of processes in consideration of a process group ID or the name of a user program and associating the hint information 1110 therewith, prefetch in consideration of the whole process group described above may be executed.

<<<1.4.1. Countermeasure for Program Including No Prefetch Library>>>

In the server 100, user programs including no prefetch library 310 are present as well. For example, such programs are programs such as a web server program, an ssh server program, a DBMS program corresponding to non in-memory computing, and the like to which implementation of a high speed through in-memory computing is not applied. In a case in which prefetch based on the madvise system call as described above is executed, swap-out or class-out may be easily executed for memory data of a process generated from a user program including no prefetch library 310, and, as a result, there are cases in which marked performance reduction is caused. As a countermeasure thereof, the prefetch optimizer 300 may repeatedly collect the actual capacity of the main memory 120 and the SCM 130 and the amount of memory data of the process of a user program including the prefetch library and, in a case in which the amount of the latter amount of data exceeds a threshold determined in accordance with the former actual capacity, may suppress the range of the prefetch or promote the class-down. In addition, the threshold may be determined as a use capacity of the main memory 120, the SCM 130, and the HDD.

<<1.5. Processing Flow of Prefetch Library>>

Figure 17:
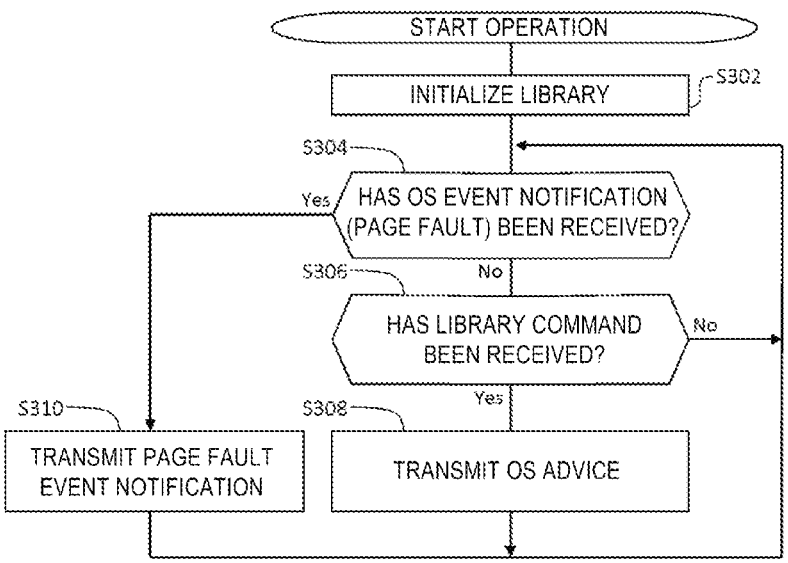
FIG. 17 is a diagram illustrating the processing flow of a prefetch library according to Embodiment 1.

FIG. 17 is a diagram illustrating the processing flow of the prefetch library 310 according to Embodiment 1. Hereinafter, the flow will be described.

(S302) The prefetch library 310 executes the initialization thereof. As a part of the initialization, preparation of communication with the prefetch optimizer 300 between processes may be considered. In addition, as a part of the initialization, information of one or more of the process ID, the process group ID (option), the name of a user program designated at the time of generating the process, and the hint information 1110 may be transmitted to the prefetch optimizer 300 by using the communication between processes.

(S304) The prefetch library 310 determines whether or not the event notification 2000 representing a page fault has been received from the OS 500. In a case in which the event notification 2000 has been received, S310 is processed. On the other hand, in a case in which the event notification 2000 has not been received, S306 is processed.

(S306) The prefetch library 310 determines whether or not the library command 1300 has been received from the prefetch optimizer 300. In a case in which the library command 1300 has been received, S308 is processed. On the other hand, in a case in which the library command 1300 has not been received, S304 is processed.

(S308) The prefetch library 310 transmits the OS advice 3000, in which a virtual page designated by the received library command 1300 is designated, and the command ID 1310 designated by the library command 1300 is designated as the advice type 3030, to the OS 500. Thereafter, S304 is processed.

(S310) The prefetch library 310 transmits the page fault event notification 1200 together with a virtual memory address at which a page fault has occurred to the prefetch optimizer 300. Thereafter, S304 is processed.

In addition, in a case in which a status in which communication with the prefetch optimizer cannot be executed is detected, a state in which a command cannot be constantly received may be formed in S306.

<<1.6. Using Both Swap-in/out and Class-up/down>>

In the server 100, as a storage medium relating to swap-in and swap-out, the secondary storage medium is not essential. However, from the following reasons, it is preferable to use both swap-in/out for the secondary storage medium as a target and class up/down for the SCM 130 as a target.

The capacity of the SCM 130 of the server 100 is limited.

There are cases in which a process generated from a user program having access locality and a process generated from an in-memory computing program are executed by the same server 100.

Also among processes generated from a user program including no prefetch library 310, there is a process operating for a limited time such as a night batch processing job.

In addition, as a method for using both the swap-in/out and the class up/down for the SCM 130 as a target, the following may be considered. However, any method other than these methods for using both thereof may be used.

(Method 1) For memory data for which class-down has been executed in the SCM 130, the possibility of being accessed is determined further based on the LRU, and memory data having a lower possibility of being accessed is set as a target for swap-out. For example, time information referred to at the time of the LRU is a class-down time. In addition, in a case in which memory data relating to a page fault is stored in the secondary storage medium, the memory data is directly swapped in the main memory 120 not through the SCM 130.

(Method 2) The memory data of a virtual page of a process including the prefetch library 310 (or a process that can receive a library command) is class-down into the SCM 130, and the memory data of virtual pages of the other processes is swapped out into the secondary storage medium 140.

(Method 3) In a case in which a process or a process group is inactive in process standby, the memory data of virtual pages of the process or the process group is swapped out into the secondary storage medium 140.

<<<1.6.1. User Interface>>>

As described until now, important points in executing the resource management and the performance management of the server 100 according to this embodiment are as follows.

Are the utilization ratios of the main memory 120, the lower class memory 130, and the secondary storage medium 140 appropriate? Particularly, in a case in which the utilization ratio of the secondary storage medium 140 is too high, it should be reviewed to extend the main memory 120 or the lower class memory 130.

Is the occurrence frequency of a page fault within an allowed range? In a case in which the occurrence frequency exceeds the allowed range, it represents that the user program is temporarily stopped excessively.

Is the occurrence frequency of swap-in/out within an allowed range? In a case in which the occurrence frequency exceeds the allowed range, thrashing occurs, and thus, it is necessary to extend the main memory 120 or the lower class memory 130 or perform area release of the main memory 120 or the lower class memory 130 in accordance with the end of an unnecessary process.

Is the occurrence frequency of class-up/down is within an allowed range? Compared to a case in which the operation is executed using only the main memory 120, by using the lower class memory 130, the degradation of the performance occurs more or less, and accordingly, it can be used as a reference value of an extension plan of the server 100 in the future.

Does the prefetch operate as is expected? In a case in which the prefetch does not operate as is expected, the tuning of the algorithm of the prefetch needs to be reviewed.

Figure 18:
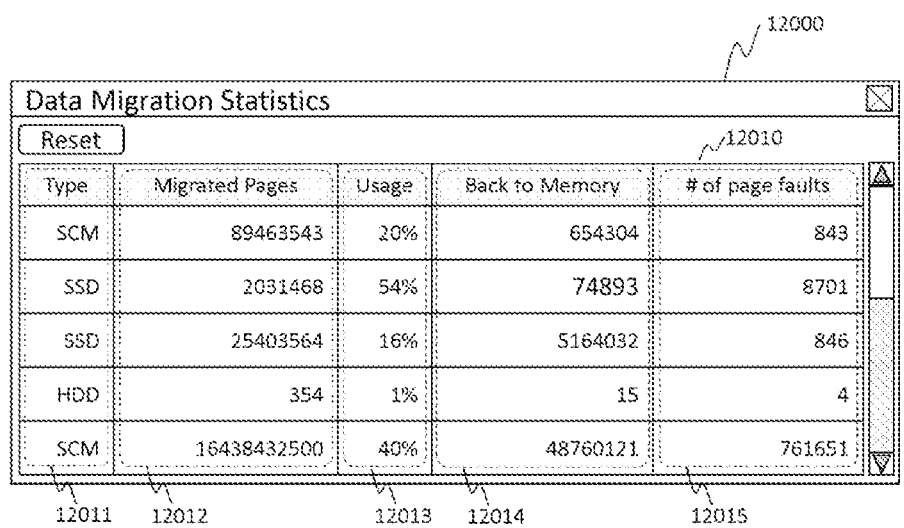
FIG. 18 is one example of a user interface.

FIG. 18 is one example of a user interface used for checking such points. This user interface is considered to be provided by the OS 500, the prefetch optimizer 310, or another management program, and information that is the source thereof is provided from the OS 500 or the prefetch optimizer 310. Information included in this user interface 12000 is as follows (all thereof do not need to be displayed, and some item groups may be displayed on another screen).

12011: Type of a storage medium. At least information that can be used for distinguishing the lower class memory and the secondary storage medium from each other is displayed. In the example illustrated in FIG. 18, individual storage devices are further divided.

12012: The number of virtual pages, of which memory data is transferred to a memory or a storage medium designated by the type 12011, per unit time. In other words, it is the number of virtual pages per unit time that are targets for swap-out or class-down.

12013: Utilization ratio from the viewpoint of the capacity of a memory or a storage medium designated by the type 12011

12014: The number of virtual pages, of which memory data is transferred from a memory or a storage medium designated by the type 12011 to the main memory 120, per unit time. In other words, the number of virtual pages per unit time that are targets for swap-in or class-up.

12015: The number of swap-in or class-up accompanying a page fault per unit time for each memory or storage medium designated by the type 12011.

In addition, the user interface illustrated in FIG. 18 may display information of only one server 100 or display information of a plurality of servers 100 to match one screen. In addition, in the latter case, there are also cases in which display is executed also in a case in which a first server supports class-up/class-down accompanying prefetch using the lower class memory 120, and a second server supports only swap of the conventional technology. Also in such cases, by assigning a server identifier to each row of the user interface 12000, for example, a supervisor can perceive that the transfer of memory data occurring in the first server is not swap but class-up or class-down in accordance with the first row of the table illustrated in FIG. 18, and the supervisor can perceive that the transfer of memory data occurring in the second server is not class-up or class-down but swap in accordance with the fourth row.

[Embodiment 2]

<2. Second Embodiment in which Prefetch Library is Included in Database Program>

<<2.1. Difference from Embodiment 1>>

Figure 9:
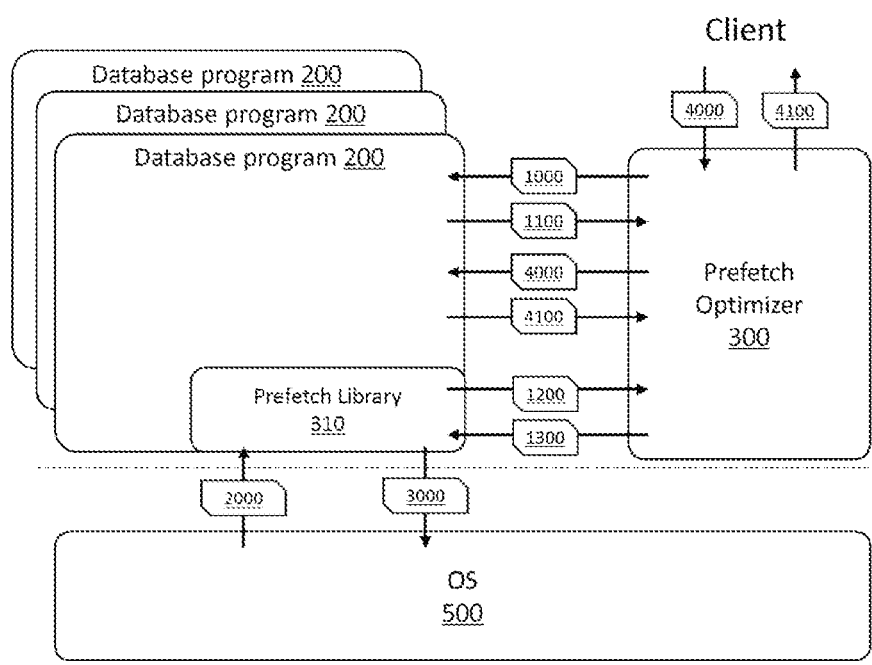
FIG. 9 is a diagram illustrating a relation of programs executed by a computer system according to Embodiment 2.

Next, Embodiment 2 will be described with reference to FIG. 9 in which a prefetch library 310 is included in the database program 200. A difference from. Embodiment 1 is that the prefetch optimizer 300 receives the client request 4000 from a client computer and forwards the client request 4000 to the database program 200.

Figure 10:
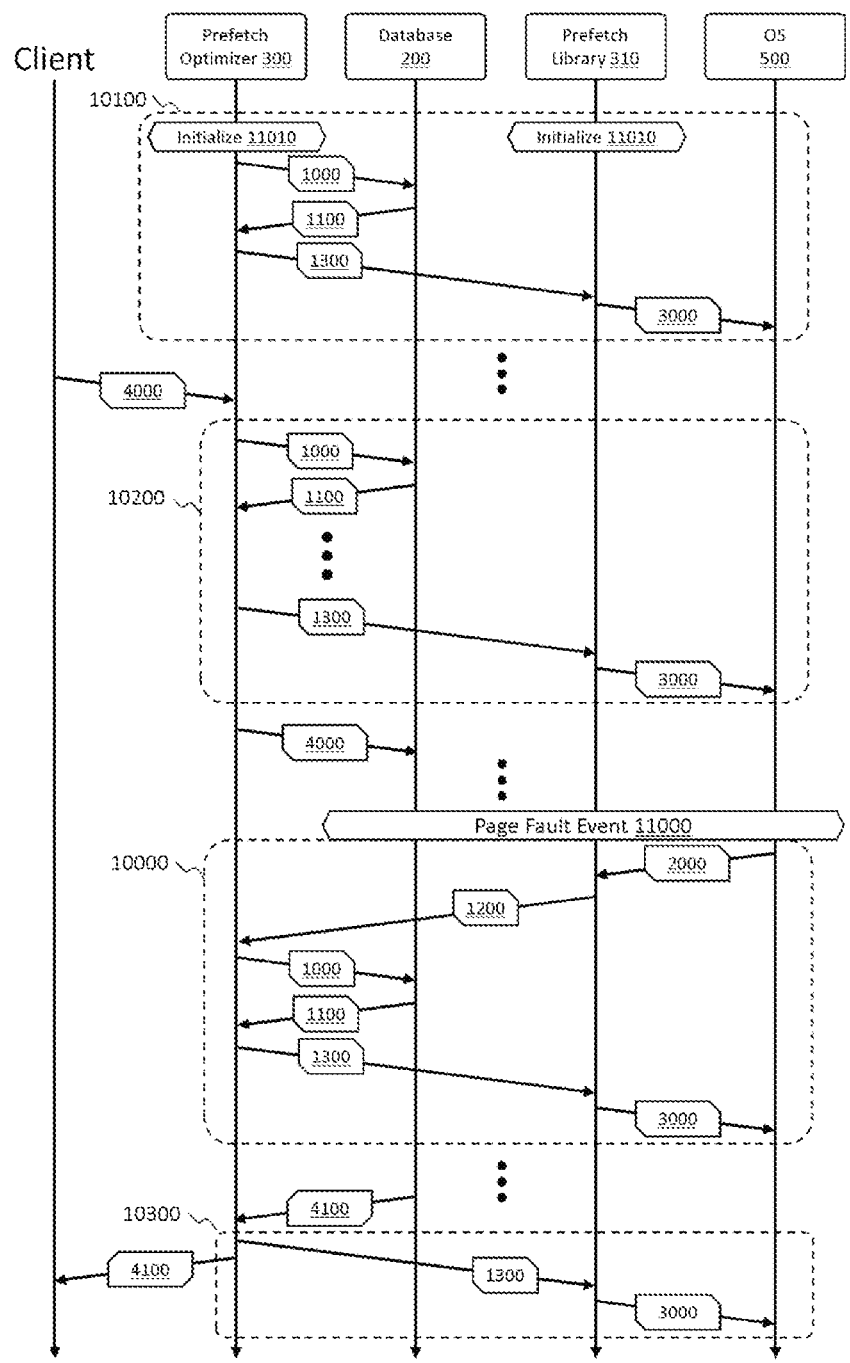
FIG. 10 is a diagram illustrating a time line of prefetch in the computer system according to Embodiment 2.

Differences from the case illustrated in FIG. 4 in a time line illustrated in FIG. 10 are as follows.

The prefetch optimizer 300 receives the client request 4000.

10200 is added before the forwarding of the client request 4000. In addition, in 10200, the library command (class-up) 1300 is transmitted to the prefetch library 310. In addition, the prefetch library 310 transmits the OS advice (class-up) 3000 to the OS 500. Accordingly, prefetch triggered upon a request from a client computer is executed. In addition, although not illustrated in the drawing, before the prefetch is executed, the prefetch optimizer 300 may acquire the hint information 1110 from the database program 200. For example, in a case in which memory data that is necessarily accessed for processing the request 4000 from a client computer is present, a virtual memory address of the memory data is acquired from the hint information.

The client request result 4100 is transmitted from the database program 200 to the prefetch optimizer 300, and thereafter, the client request result 4100 is transmitted to the client computer.

10300 is added after the reception of the client request result 4100 in the prefetch optimizer 300. In addition, in 10300, the library command (class-down) 1300 designating the virtual memory address of the memory data referred to in the client request process is transmitted. The prefetch library 310 transmits the OS advice (class-down) 3000 to the OS 500. Accordingly, the memory data accessed in accordance with the client request is class-down in a speedy manner, and another virtual page can be easily class-up in the main memory 120.

<<2.2. Processing Flow of Prefetch Optimizer>>

Figure 16:
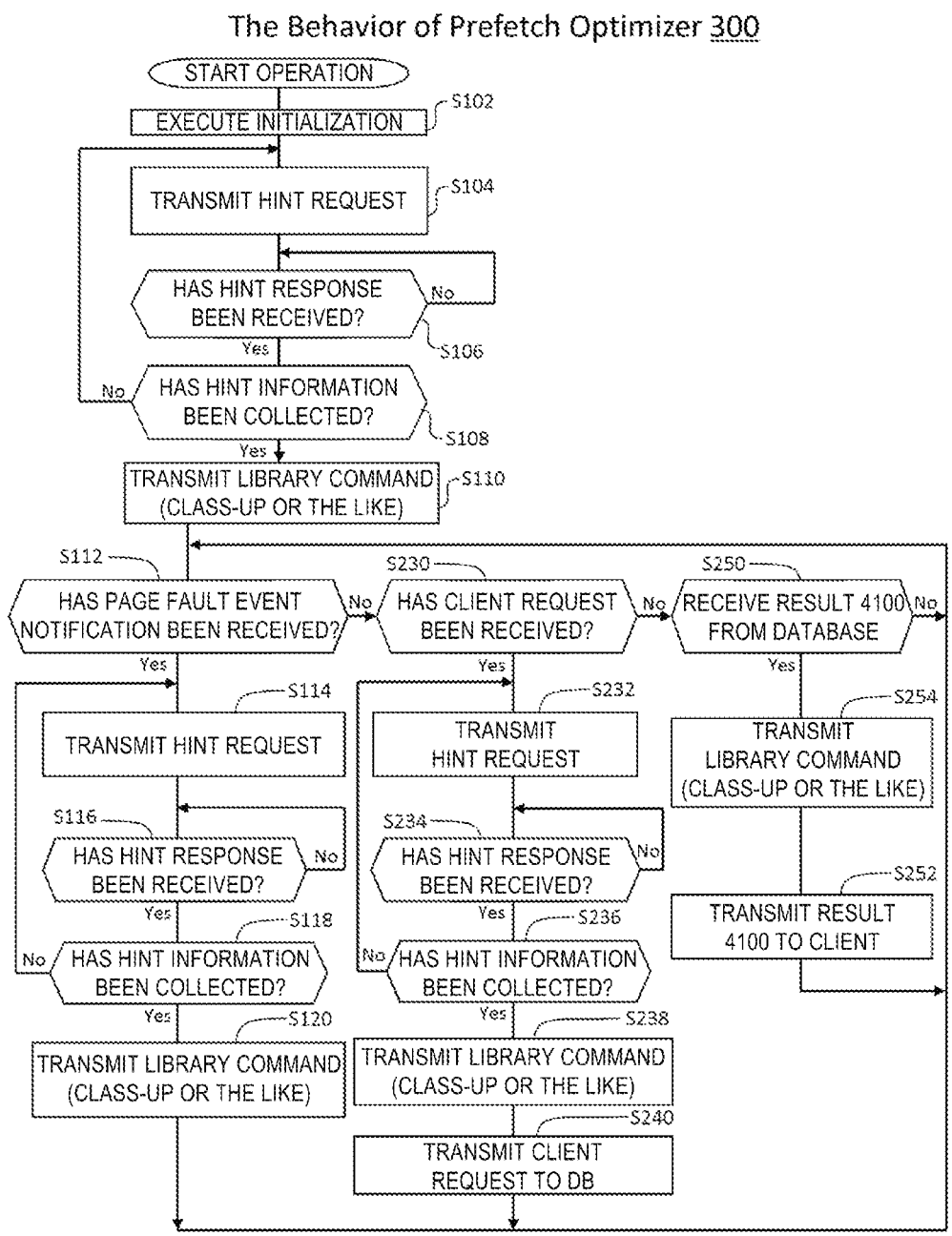
FIG. 16 is a diagram illustrating the processing flow of a prefetch optimizer according to Embodiment 2.

FIG. 16 is a diagram illustrating the processing flow of the prefetch optimizer 300 according to Embodiment 2. A step to which the same number as that of FIG. 15 is assigned has the same processing content as that of FIG. 15. Hereinafter, differences from Embodiment 1 will be focused.

S230 to S238 are processes for transmitting the library command (class-up) 1300 triggered upon the received client request 4000. Each of the steps has been described in "2.1.", and thus the description thereof will not be presented here.

S240 is a process in which the prefetch optimizer 300 forwards the received client request 4000 to the database program 200. S250 and S252 are processes in which the client request result 4100 for the client request 4000 received from the database program 200 is transmitted to the client computer.

S254 is a process in which, after the client request result 4100 is received from the database program 200, the library command (class-down) 1300 designating the range of virtual memory addresses in which memory data accessed when the client request is processed is included is transmitted.

As above, Embodiment 2 has been described.

[Embodiment 3]

<3. Form in which Prefetch Optimizer Detects a Page Fault not Through Prefetch Library>

In Embodiments 1 and 2 described above, a technology in which the prefetch library 310 detects a page fault, and information thereof is transmitted to the prefetch optimizer 300 has been disclosed. However, in this Embodiment 3 as another embodiment, the prefetch optimizer 300 detects a page fault not through the prefetch library 310.

In each of kernels of recent years, since a framework for analyzing the operation of the inside of the kernel (for example, SystemTap in the case of Linux) is present, it may be set such that direct or indirect arguments of a function and a return value (a process ID that is a trigger of the occurrence of a page fault and an address of a virtual memory at the time of accessing) of the function are transmitted to the prefetch optimizer 300 (information is exchanged using a file) when the function arranged inside the kernel detecting a page fault inside the kernel is called in the framework.

<5. Summary>

As above, the computer systems according to Embodiments 1 to 4 have been described. In addition, in Embodiments 1 to 3, the processing load in the prefetch library 310 is decreased such that a processing load for prefetch and class-up/down is not applied to a process generated in accordance with the execution of the database program as possibly as can. However, apart of processes executed by the prefetch optimizer 300 may be executed by the prefetch library 310.

In addition, in the process of class-out executed by the OS 500, determination of a device of the lower class memory 120 that is a transfer destination of the memory data and a real page inside the device is executed by the OS 500. However, this determination process may be executed by the prefetch library 310 or the prefetch optimizer 300. In such a case, a real page and a device of the transfer destination can be designated in the library command 1300 and the OS advice 3000.

In addition, in a case in which a hypervisor operates in the server 100, the OS 500 may execute a process using an emulated main memory of a VM provided by the hypervisor, and the hypervisor may execute class-up and class-down using the lower class memory.

The embodiments described above are examples for describing the present invention and are not for the purpose of limiting the range of the present invention to the embodiments. A person skilled in the art may execute the present invention in various forms without departing from the concept of the present invention.

REFERENCE SIGNS LIST

100: server
110: CPU
120: main memory
130: lower class memory
140: secondary storage medium
200: database
300: prefetch optimizer
310: prefetch library
500: OS

The invention claimed is:

1. A computer system comprising:
a secondary storage medium storing target data including a plurality of data objects, an operating system, an in-memory computing program for processing target data including the plurality of data objects, and a prefetch optimizer program;
a CPU executing the operating system, the in-memory computing program, and the prefetch optimizer program;
a main memory divided into a plurality of real pages to be managed by the operating system and the CPU; and
a lower class memory, which has an access delay time longer than that of the main memory and the access delay time shorter than that of the secondary storage medium, divided into a plurality of real pages to be managed by the operating system and the CPU, wherein
the operating system:
(a) generates a first process for the in-memory computing program including a first virtual address space, divides the first virtual address space into a plurality of first virtual pages, and allocates the real pages of the main memory to the first virtual pages,
the first process:
(1) executes a load process in which a plurality of continuous areas each having a size that is the size of the virtual page or more are secured on the first virtual address space, and the data objects included in the target data are written into the plurality of continuous areas; and
(2) accesses the data objects stored in the plurality of continuous areas for processing by the in-memory computing program,
the operating system:
(b) transfers memory data stored in a virtual page having a low possibility of being accessed from a real page of the main memory to a real page of the lower class memory;
(c) detects a page fault for a predetermined first virtual page; and
(d) transfers the memory data of the predetermined first virtual page from a real page of the lower class memory to an unused real page of the main memory and executes a class-up process for the predetermined first virtual page in which the unused real page is allocated to the predetermined first virtual page, and
a second process generated with the prefetch optimizer program:
(A) acquires a continuous area including the predetermined first virtual page from the first process; and
(B) directs the operating system to execute a class-up process for another virtual page included in the acquired continuous area.

2. A memory management method in a computer system including:
a secondary storage medium storing target data including a plurality of data objects, an operating system, an in-memory computing program for processing the target data including the plurality of data, and a prefetch optimizer program;

a CPU executing the operating system, the in-memory computing program, and the prefetch optimizer program;

a main memory divided into a plurality of real pages to be managed by the operating system and the CPU; and a lower class memory, which has an access delay time longer than that of the main memory and the access delay time shorter than that of the secondary storage medium, divided into a plurality of real pages to be managed by the operating system and the CPU, the memory management method comprising:

the operating system:

(a) generating a first process for the in-memory computing program including a first virtual address space, dividing the first virtual address space into a plurality of first virtual pages, and allocating real pages of the main memory to the first virtual pages, the first process:

(1) executing a load process in which a plurality of continuous areas each having a size that is the size of the virtual page or more are secured on the first virtual address space, and the data objects included in the target data are written into the plurality of continuous areas; and (2) accessing the data objects stored in the plurality of continuous areas for processing the in-memory computing program, the operating system:

(b) transferring memory data stored in a virtual page having a low possibility of being accessed from a real page of the main memory to a real page of the lower class memory;

(c) detecting a page fault for a predetermined first virtual page; and (d) transferring the memory data of the predetermined first virtual page from a real page of the lower class memory to an unused real page of the main memory and executing a class-up process for the predetermined first virtual page in which the unused real page is allocated to the predetermined first virtual page, and a second process generated with the prefetch optimizer program:

(A) acquiring a continuous area including the predetermined first virtual page from the first process; and (B) directing the operating system to execute a class-up process for another virtual page included in the acquired continuous area.

* * * * *